(12) United States Patent
Guo

(10) Patent No.: US 11,086,460 B2
(45) Date of Patent: Aug. 10, 2021

(54) TOUCH SUBSTRATE, METHOD FOR MANUFACTURING SAME, AND TOUCH DEVICE

(71) Applicants: CHONGQING BOE OPTOELECTRONICS TECHNOLOGY CO., LTD., Chongqing (CN); BOE TECHNOLOGY GROUP CO., LTD., Beijing (CN)

(72) Inventor: Jiandong Guo, Beijing (CN)

(73) Assignees: CHONGQING BOE OPTOELECTRONICS TECHNOLOGY CO., LTD., Chongqing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/644,653

(22) PCT Filed: Jul. 26, 2019

(86) PCT No.: PCT/CN2019/097931
§ 371 (c)(1),
(2) Date: Mar. 5, 2020

(87) PCT Pub. No.: WO2020/020353
PCT Pub. Date: Jan. 30, 2020

(65) Prior Publication Data
US 2021/0064185 A1    Mar. 4, 2021

(30) Foreign Application Priority Data

Jul. 26, 2018 (CN) .......................... 201810833729.5

(51) Int. Cl.
*G06F 3/044* (2006.01)
*G06F 3/047* (2006.01)

(52) U.S. Cl.
CPC ............ *G06F 3/0445* (2019.05); *G06F 3/047* (2013.01); *G06F 3/0446* (2019.05);
(Continued)

(58) Field of Classification Search
CPC .......... G06F 3/0445–0446; G01J 3/506; G01J 3/524; G01J 3/46; G02F 1/13439; G02F 1/13452; G02F 1/1345; G02F 1/1343
See application file for complete search history.

(56) References Cited

U.S. PATENT DOCUMENTS

2009/0314621 A1* 12/2009 Hotelling ............... G06F 3/0443
200/600
2011/0248938 A1   10/2011 Kwak et al.
(Continued)

FOREIGN PATENT DOCUMENTS

CN    103246420 A    8/2013
CN    104615323 A    5/2015
(Continued)

OTHER PUBLICATIONS

International search report of PCT application No. PCT/CN2019/097931 dated Oct. 29, 2019.
(Continued)

*Primary Examiner* — Sanjiv D. Patel
(74) *Attorney, Agent, or Firm* — Fay Sharpe LLP

(57) ABSTRACT

Disclosed is a touch substrate which includes: a substrate having a first area and a second area arranged side by side; and a plurality of touch electrodes, arranged in an array on the substrate and including a plurality of first touch electrodes in the first area and a plurality of second touch electrodes in the second area. First lead wires, located in the
(Continued)

first area, are connected to first touch electrodes in a one-to-one correspondence. Second lead wires, located in the second area, are connected to second touch electrodes in a one-to-one correspondence. The first and second lead wires all extend toward a side where the first area is located. Third lead wires, located in the first area, are insulated from first touch electrodes. A unit length of the third lead wires has a lower resistance than a unit length of the second lead wires.

16 Claims, 15 Drawing Sheets

(52) U.S. Cl.
CPC .. *G06F 3/0448* (2019.05); *G06F 2203/04103* (2013.01); *G06F 2203/04111* (2013.01)

(56) References Cited

U.S. PATENT DOCUMENTS

| | | | | |
|---|---|---|---|---|
| 2013/0277186 | A1* | 10/2013 | Sekizawa | H03K 17/9618 200/181 |
| 2016/0044778 | A1 | 2/2016 | Irie et al. | |
| 2016/0293631 | A1 | 10/2016 | Sun et al. | |
| 2016/0313844 | A1 | 10/2016 | Chen et al. | |
| 2016/0378240 | A1 | 12/2016 | Li et al. | |
| 2017/0277316 | A1* | 9/2017 | Teranishi | G06F 3/0446 |
| 2018/0373359 | A1* | 12/2018 | Han | G06F 3/0443 |

FOREIGN PATENT DOCUMENTS

| | | |
|---|---|---|
| CN | 104699349 A | 6/2015 |
| CN | 104793820 A | 7/2015 |
| CN | 206639202 U | 11/2017 |
| CN | 107422903 A | 12/2017 |
| CN | 107704143 A | 2/2018 |
| CN | 108490708 A | 9/2018 |
| CN | 109976569 A | 7/2019 |

OTHER PUBLICATIONS

First office action of Chinese application No. 201810833729.5 dated Nov. 29, 2019.

* cited by examiner

TOUCH SUBSTRATE, METHOD FOR MANUFACTURING SAME, AND TOUCH DEVICE

The present application is a 371 of PCT Application No. PCT/CN2019/097931 filed Jul. 26, 2019, which claims priority to Chinese Patent Application No. 201810833729.5, filed on Jul. 26, 2018 and entitled "TOUCH PANEL, METHOD FOR MANUFACTURING SAME, AND TOUCH DEVICE", the contents of which are incorporated herein by reference in its entirety.

TECHNICAL FIELD

The present disclosure relates to the field of touch technology, and in particular to a touch substrate, a method for manufacturing same, and a touch device.

BACKGROUND

A self-capacitance touch panel is commonly used and usually includes a substrate and touch electrodes formed on the substrate. When the touch panel is touched, the capacitance between a touched touch electrode and ground changes, which leads to a change in the current in a lead wire connected to the touch electrode. A touch integrated circuit (IC) then determines the position as touched according to the current change in the lead wire.

SUMMARY

Embodiments of the present disclosure provide a touch substrate, a method for manufacturing same, and a touch device.

In one aspect, an embodiment of the present disclosure provides a touch substrate, including:

a substrate, the substrate having a first area and a second area arranged side by side in a direction parallel to the substrate;

a plurality of touch electrodes, the plurality of touch electrodes being arranged in an array on the substrate, and the plurality of touch electrodes including a plurality of first touch electrodes located in the first area and a plurality of second touch electrodes located in the second area; and a plurality of lead wires, the plurality of lead wires being located on the substrate and extending along an arrangement direction of the first area and the second area, and the plurality of lead wires including a plurality of first lead wires, a plurality of second lead wires, and a plurality of third lead wires, wherein the plurality of first lead wires are located in the first area and are connected to the first touch electrodes in a one-to-one correspondence, the plurality of second lead wires are located in the second area and are connected to the second touch electrodes in a one-to-one correspondence, and all the plurality of first lead wires and the plurality of second lead wires extend toward a side where the first area is located, the plurality of third lead wires are located in the first area and are insulated from the first touch electrodes, the plurality of third lead wires are connected to the plurality of second lead wires in a one-to-one correspondence, and a unit length of the third lead wires has a lower resistance than a unit length of the second lead wires.

Optionally, the plurality of third lead wires and the first touch electrodes are in different layers.

Optionally, a width of the third lead wires is greater than a width of the second lead wires, and the third lead wires and the second lead wires are made of a same material.

Optionally, each touch electrode is rectangular, and the width of the third lead wires is greater than 20% of a width of the touch electrodes.

Optionally, a thickness of the third lead wires is the same as a thickness of the second lead wires.

Optionally, projections of the third lead wires and the first touch electrodes onto the substrate partially overlap.

Optionally, the plurality of third lead wires and the plurality of second lead wires have any one of the following relationships: the plurality of third lead wires and the plurality of second lead wires are in a same layer; the third lead wires and the second lead wires are in different layers, and the third lead wires and the second lead wires are connected by vias.

Optionally, the second touch electrodes include two layers of sub-electrodes, orthographic projections of the two layers of sub-electrodes onto the substrate overlap, and the two layers of sub-electrodes are connected by vias.

Optionally, one layer of sub-electrodes in the two layers of sub-electrodes and the first touch electrodes are in a same layer, and the other layer of sub-electrodes in the two layers of sub-electrodes and the third lead wires are in a same layer.

Optionally, the second touch electrodes are single-layer electrodes.

Optionally, the second touch electrodes and the first touch electrodes are in different layers.

Optionally, the second touch electrodes and the first touch electrodes are in a same layer.

Optionally, the thickness of the second touch electrodes is greater than the thickness of the first touch electrodes.

Optionally, the plurality of first lead wires and the plurality of first touch electrodes are in a same layer.

Optionally, the plurality of second lead wires and the plurality of first touch electrodes are in a same layer.

Optionally, the touch substrate further includes fourth lead wires located in a different layer from the second lead wires, an orthographic projection of the fourth lead wire onto the substrate and an orthographic projection of the second lead wire onto the substrate overlap, and the fourth lead wires and the second lead wires are connected by vias.

Optionally, the plurality of touch electrodes and the plurality of lead wires are all made of a transparent conductive material.

Optionally, the plurality of touch electrodes, the first lead wires, and the second lead wires are made of a transparent conductive material, and the third lead wires are made of a metal material.

In another aspect, an embodiment of the present disclosure further provides a touch device, including the foregoing touch substrate.

In still another aspect, an embodiment of the present disclosure further provides a method for manufacturing a touch substrate, including:

providing a substrate; and forming a plurality of touch electrodes and a plurality of lead wires on the substrate, wherein the plurality of touch electrodes are arranged in an array on the substrate, the plurality of touch electrodes include a plurality of first touch electrodes located in a first area and second touch electrodes located in a second area, and the first area and the second area are arranged side by side on the substrate, the plurality of lead wires extend along an arrangement direction of the first area and the second area, the plurality of lead wires include a plurality of first lead wires, a plurality of second lead wires, and a plurality of third lead wires, the plurality of first lead wires are located in the first area and are connected to the first touch electrodes in a one-to-one correspondence, the plurality of second lead wires are located in the second area and are connected to the second touch electrodes in a one-to-one correspondence, all the plurality of first lead wires and the plurality of second lead wires extend toward a side where the first area is located, the plurality of third lead wires are located in the first area and are insulated from the first touch electrodes, the plurality of third lead wires are connected to the plurality of second lead wires in a one-to-one correspondence, and a unit length of the third lead wires has a lower resistance than a unit length of the second lead wires.

Optionally, the forming the plurality of touch electrodes and the plurality of lead wires on the substrate includes:

forming a first patterned layer on the substrate;

forming an insulating layer on the substrate;

forming vias in the insulating layer; and forming a second patterned layer on the insulating layer, wherein one of the first patterned layer and the second patterned layer includes a plurality of first touch electrodes, the plurality of first lead wires, and a plurality of first sub-electrodes, the other of the first patterned layer and the second patterned layer includes the plurality of second lead wires, the plurality of third lead wires, and a plurality of second sub-electrodes, the plurality of second lead wires are connected to the plurality of second sub-electrodes in a one-to-one correspondence, orthographic projections of the plurality of second sub-electrodes and the plurality of first sub-electrodes onto the substrate overlap, and the plurality of second sub-electrodes and the plurality of first sub-electrodes are connected in a one-to-one correspondence by vias to form the plurality of second touch electrodes.

Optionally, the forming the plurality of touch electrodes and the plurality of lead wires on the substrate includes:

forming a first patterned layer on the substrate, wherein the first patterned layer includes the plurality of first touch electrodes, the plurality of second touch electrodes, and the plurality of first lead wires, and the thickness of the second touch electrodes is greater than the thickness of the first touch electrodes;

forming an insulating layer on the substrate, wherein the thickness of the insulating layer is less than the thickness of the second touch electrodes and is greater than the thickness of the first touch electrode; and forming a second patterned layer on the insulating layer, wherein the second patterned layer includes the plurality of second lead wires and the plurality of third lead wires.

Optionally, the forming the plurality of touch electrodes and the plurality of lead wires on the substrate includes:

forming a first patterned layer on the substrate, wherein the first patterned layer includes the plurality of first touch electrodes, the plurality of first lead wires, and a plurality of first sub-electrodes;

forming, on the substrate, an insulating layer covering the first patterned layer;

forming, in the insulating layer, a plurality of openings exposing the plurality of first sub-electrodes, wherein the plurality of openings and the plurality of first sub-electrodes are arranged in a one-to-one correspondence; and forming a second patterned layer on the insulating layer, wherein the second patterned layer includes the plurality of second lead wires, the plurality of third lead wires, and a plurality of second sub-electrodes in a one-to-one correspondence with the plurality of first sub-electrodes, the plurality of second sub-electrodes are located in the plurality of openings, and the second sub-electrodes are stacked on corresponding first sub-electrodes to obtain the plurality of second touch electrodes.

Optionally, the forming the plurality of touch electrodes and the plurality of lead wires on the substrate includes:

forming a first patterned layer on the substrate;

forming an insulating layer on the substrate formed with the first patterned layer; and forming a second patterned layer on the insulating layer, wherein one of the first patterned layer and the second patterned layer includes the plurality of first touch electrodes and the plurality of first lead wires, the other of the first patterned layer and the second patterned layer includes the plurality of second touch electrodes, the plurality of second lead wires, and the plurality of third lead wires.

Optionally, one of the first patterned layer and the second patterned layer that includes the plurality of first lead wires further includes a plurality of fourth lead wires, orthographic projections of the plurality of fourth lead wires and the plurality of second lead wires onto the substrate overlap, and the plurality of fourth lead wires and the plurality of second lead wires are connected in a one-to-one correspondence by vias.

Optionally, the forming the plurality of touch electrodes and the plurality of lead wires on the substrate includes:

forming a first patterned layer on the substrate;

forming an insulating layer on the substrate;

forming vias in the insulating layer; and forming a second patterned layer on the insulating layer, wherein one of the first patterned layer and the second patterned layer includes the plurality of first touch electrodes, the plurality of first lead wires, the plurality of second touch electrodes, and the plurality of second lead wires, the other of the first patterned layer and the second patterned layer includes the plurality of third lead wires, and the plurality of third lead wires and the plurality of second lead wires are connected in a one-to-one correspondence by vias.

DETAILED DESCRIPTION

The present disclosure will be described in further detail with reference to the accompanying drawings, to present the objects, technical solutions, and advantages of the present disclosure more clearly.

Figure 1:
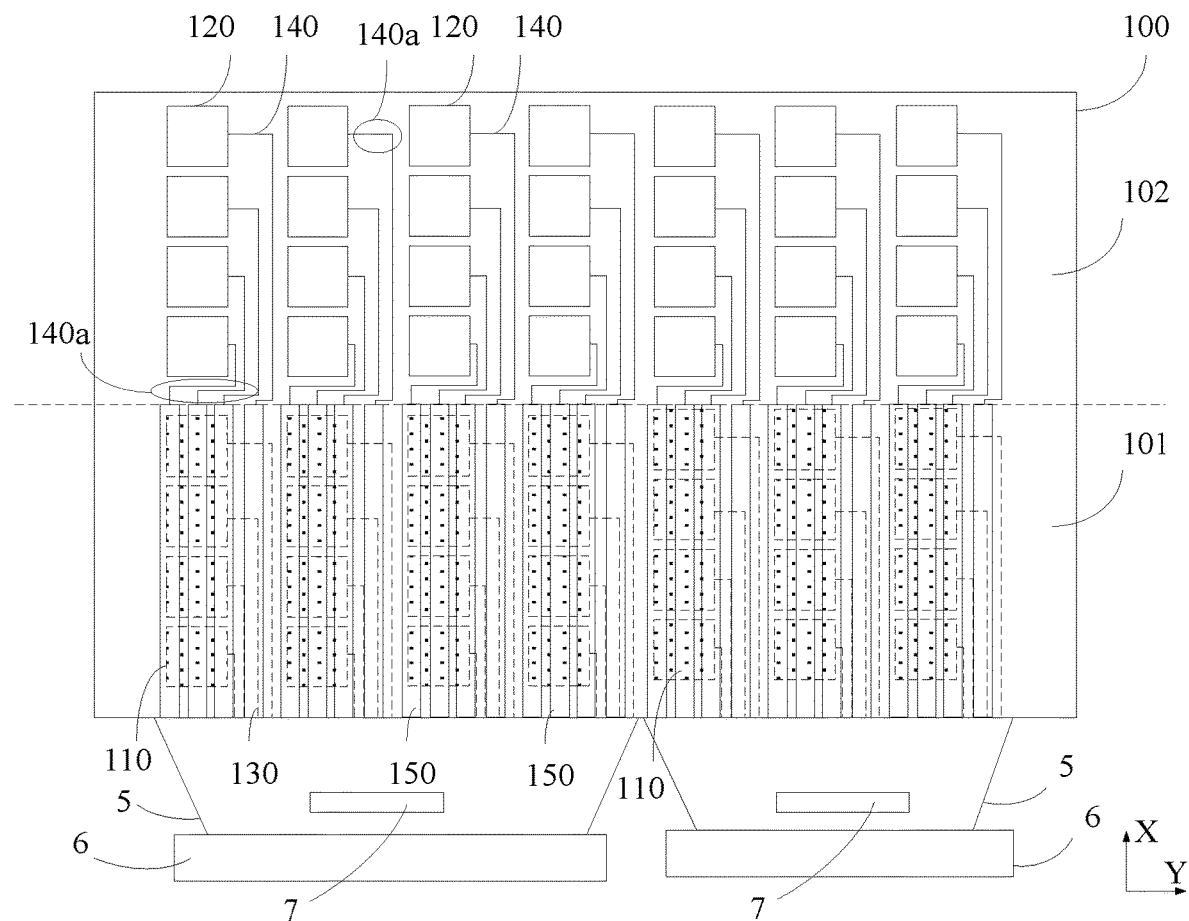
FIG. 1 is a partial schematic structural diagram of a touch substrate according to an embodiment of the present disclosure.

FIG. 1 is a partial schematic structural diagram of a touch substrate according to an embodiment of the present disclosure. As shown in FIG. 1, the touch substrate includes a substrate 100, a plurality of touch electrodes (touch electrodes 110 and 120 shown in FIG. 1), a plurality of lead wires (lead wires 130, 140, and 150 shown in FIG. 1).

The substrate 100 has a first area 101 and a second area 102 arranged side by side in a direction parallel to the substrate 100. The plurality of touch electrodes are arranged in an array on the substrate 100. The plurality of touch electrodes include a plurality of first touch electrodes 110 located in the first area 101 and a plurality of second touch electrodes 120 located in the second area 102. The first area 101 and the second area 102 are two planar areas determined on the substrate 100. The two planar areas are distributed side by side in a direction parallel to the substrate 100. As shown in FIG. 1, the first area 101 and the second area 102 are both rectangular and the first area 101 and the second area 102 are distributed side by side in X direction in FIG. 1.

In an embodiment of the present disclosure, an object being located in the first area 101 means that an orthographic projection of the object onto the substrate 100 is located in the first area 101, and an object being located in the second area 102 means that an orthographic projection of the object onto the substrate 100 is located in the second area 102. For example, when the plurality of first touch electrodes 110 are located in the first area 101, it means that orthographic projections of the plurality of first touch electrodes 110 onto the substrate 100 are located in the first area 101.

The plurality of lead wires are disposed on the substrate 100 and extend along an arrangement direction (that is, the X direction in FIG. 1) of the first area 101 and the second area 102. The plurality of lead wires include a plurality of first lead wires 130, a plurality of second lead wires 140, and a plurality of third lead wires 150. The plurality of first lead wires 130 are located in the first area 101 and are connected to the first touch electrodes 110 in a one-to-one correspondence. The plurality of second lead wires 140 are located in the second area 102 and are connected to the second touch electrodes 120 in a one-to-one correspondence. All the plurality of first lead wires 130 and the plurality of second lead wires 140 extend toward a side where the first area is located (for example, the bottom side shown in FIG. 1).

The plurality of third lead wires 150 are located in the first area 101, and are disposed in a different layer from the first touch electrodes 110 and are insulated therefrom. The plurality of third lead wires 150 are connected to the plurality of second lead wires 140 in a one-to-one correspondence. A unit length of the third lead wires 150 has a lower resistance than a unit length of the second lead wires 140.

Herein, when structures are located in different layers, it means that, for example, the structures may be located on different sides of a layer, or the structures are formed by using different patterning processes, or surfaces, near the substrate, of the structures are in contact with different layers. When two layer structures are in different layers, orthographic projections of the two layer structures onto the substrate may overlap, partially overlap (which may also be referred to as interlacing) or not overlap (which may also be referred to as staggering). For example, the third lead wire 150 and the first touch electrode 110 in the embodiment shown in FIG. 1 partially overlap. Alternatively, in another embodiments, the third lead wire 150 and the first touch electrode 110 may not overlap. For example, an orthographic projection of a third lead wire 150 onto the substrate may be between orthographic projections of the first touch electrodes 110 onto the substrate.

The first lead wires 130 are arranged in a gap between adjacent first touch electrodes 110, and the second lead wires 140 are arranged in a gap between adjacent second touch electrodes 120. Therefore, to facilitate the connection between the first lead wires 130 and the first touch electrodes 110, and to facilitate the connection between the second lead wires 140 and the second touch electrodes 120 or the third lead wires 150, bending portions may be disposed at end portions of the first lead wires 130 and the second lead wires 140. For example, bending portions 140a are disposed at both ends of a second lead wire 140 shown in FIG. 1.

When being disposed in the first area, the third lead wires are located in a different layer and insulated from the first touch electrodes in the first area. The third lead wires are connected in a one-to-one correspondence to the second lead wires which are connected with the second touch electrodes in the second area. As a unit length of the third lead wires has a lower resistance than a unit length of the second lead wires, the resistance of the lead wires connecting the second touch electrodes and the touch IC can be reduced. As such, when the touch substrate has a relatively large area, the effect of touch detection can be prevented from being affected by relatively long lead wires and relatively large resistance. Because the resistance of the lead wires between the second touch electrodes and the touch IC is relatively small, a touch signal can be normally transmitted to enable the touch IC to functionally recognize the position as touched, thereby improving the accuracy of touch detection of the touch substrate.

In FIG. 1, the plurality of first lead wires 130 are configured to connect the plurality of first touch electrodes 110 to a touch IC 7 on a flexible circuit board 5. The plurality of second lead wires 140 and the plurality of third lead wires 150 are configured to connect the plurality of second touch electrodes 120 to the touch IC 7 on the flexible circuit board 5. The flexible circuit board 5 is located on one side of the touch substrate. The first area 101 is located between the flexible circuit board 5 and the second area 102.

The plurality of first lead wires 130 and the plurality of third lead wires 150 are all connected to the flexible circuit board 5. The touch IC 7 may be fixed on the flexible circuit board 5. The flexible circuit board 5 may further be connected to a printed circuit board 6 of a touch panel. The printed circuit board 6 may be connected to a processor and a power supply (that is, a motherboard) of a display panel.

Alternatively, the touch IC may be located on a chip on film (COF) circuit board.

The touch panel may include more than one touch IC 7. Each touch IC 7 is connected to a plurality of touch electrodes. Because each touch IC 7 can only be connected to a limited quantity of touch electrodes, if there is only one touch IC 7, the quantity of touch electrodes in a unit area on a touch substrate with a relatively large area is less than that on a touch substrate with a relatively small area, resulting in reduced precision of the touch panel. Therefore, by having more than one touch ICs 7, for touch electrodes with a same size, more touch electrodes can be disposed, thereby increasing a quantity of touch electrodes in a unit area on the touch panel and helping improve the precision of the touch panel.

For example, two touch ICs 7 are disposed in FIG. 1. Each touch IC 7 is connected to some touch electrodes. The touch IC 7 on the left is connected to four columns of touch electrodes and the touch IC 7 on the right is connected to three columns of touch electrodes. When two or more touch ICs are disposed in the Y direction, a touch position can be recognized even if a touch panel is relatively wide (that is, the size in the Y direction is relatively large). It should be noted that the quantity of touch ICs and the quantity of touch electrodes in FIG. 1 are only exemplary, and may be set according to actual requirements. This is not limited in the present disclosure.

The substrate 100 in an embodiment of the present disclosure may be a color film substrate. In another embodiment, the substrate 100 may be a transparent substrate. The touch substrate can be disposed in a display panel. For example, the substrate 100 may be bonded to a color film substrate of an existing display panel.

Figure 2:
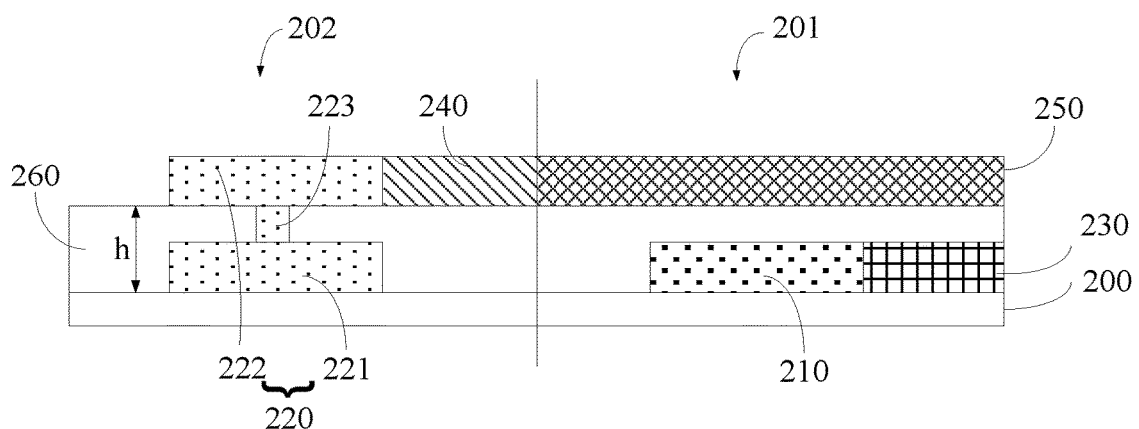
FIG. 2 is a partial schematic sectional view of a touch substrate according to an embodiment of the present disclosure.

FIG. 2 is a partial schematic sectional view of a touch substrate according to an embodiment of the present disclosure, and shows a relationship among layers including touch electrodes and lead wires in the first area and the second area. FIG. 2 exemplarily shows one first touch electrode 210 and one second touch electrode 220 that are adjacent in an arrangement direction of a first area 201 and a second area 202. For conciseness, FIG. 2 is illustrated exemplarily by lead wires which do not include any bending portion.

As shown in FIG. 2, the second touch electrode 220 includes a first sub-electrode 221 and a second sub-electrode 222. Orthographic projections of the first sub-electrode 221 and the second sub-electrode 222 onto a substrate 200 overlap. The first sub-electrodes 221 and the second sub-electrodes 222 are connected by vias 223. The second touch electrode is disposed with two layers. This equals to that the thickness of the second touch electrode is increased. That is, the sectional area of the second touch electrode is increased. As such, the resistance of the second touch electrode can be reduced. In this case, the thickness of the second touch electrode is equal to a sum of thicknesses of two layers of sub-electrodes and is greater than the thickness of the first touch electrode.

In the touch substrate shown in FIG. 2, a first patterned layer, an insulating layer 260, and a second patterned layer are formed on the substrate 200. The insulating layer 260 covers the first patterned layer, and the second patterned layer is located on the insulating layer 260.

In this embodiment, the thickness h of the insulating layer 260 is greater than the thickness of the first patterned layer, so that the insulating layer 260 can cover the first patterned layer. In this embodiment, the thickness of the insulating layer 260 refers to a maximum size of the insulating layer 260 in a direction perpendicular to the substrate 200.

For example, the insulating layer 260 may be a SiO2 layer. The SiO2 layer has good insulation performance and light transmittance.

Figure 3:
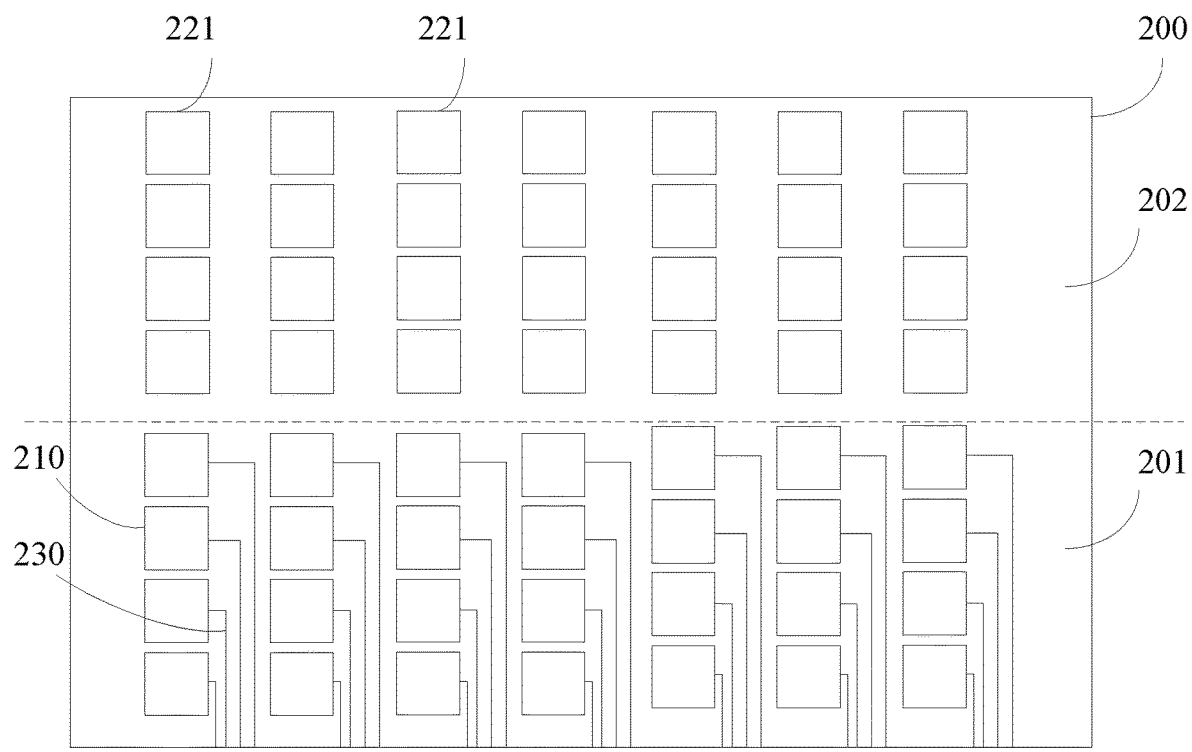
FIG. 3 is a schematic structural diagram of a first patterned layer according to an embodiment of the present disclosure.

FIG. 3 is a schematic structural diagram of a first patterned layer according to an embodiment of the present disclosure. As shown in FIG. 3, the first patterned layer includes first touch electrodes 210, first lead wires 230, and first sub-electrodes 221. The first touch electrodes 210 and the first sub-electrodes 221 are arranged in an array. The first lead wires 230 are connected to the first touch electrodes 210 in a one-to-one correspondence. The plurality of first lead wires 230 all extend along an arrangement direction of a first area 201 and a second area 202 toward a side (that is, the bottom side in FIG. 3) where the first area 201 is located.

Figure 4:
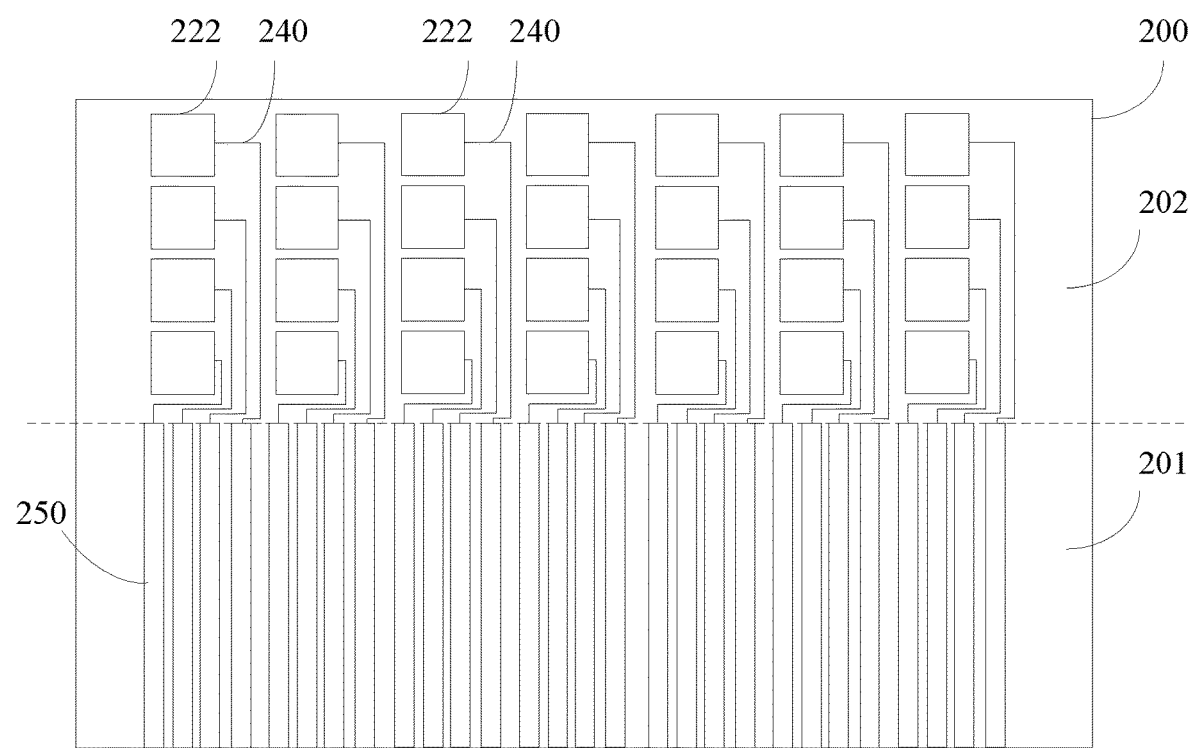
FIG. 4 is a schematic structural diagram of a second patterned layer according to an embodiment of the present disclosure.

FIG. 4 is a schematic structural diagram of a second patterned layer according to an embodiment of the present disclosure. As shown in FIG. 4. the second patterned layer includes second sub-electrodes 222, second lead wires 240, and third lead wires 250. The second sub-electrodes 222 are arranged in an array in a second area 202. The second lead wires 240 are connected to the second sub-electrodes 222 in a one-to-one correspondence. The plurality of second lead wires 240 all extend along an arrangement direction of a first area 201 and the second area 202 toward a side (that is, the bottom side in FIG. 4) where the first area 201 is located. The plurality of third lead wires 250 are arranged in parallel at intervals in the first area 201. The plurality of third lead wires 250 are connected to the plurality of second lead wires 240 in a one-to-one correspondence.

Figure 5:
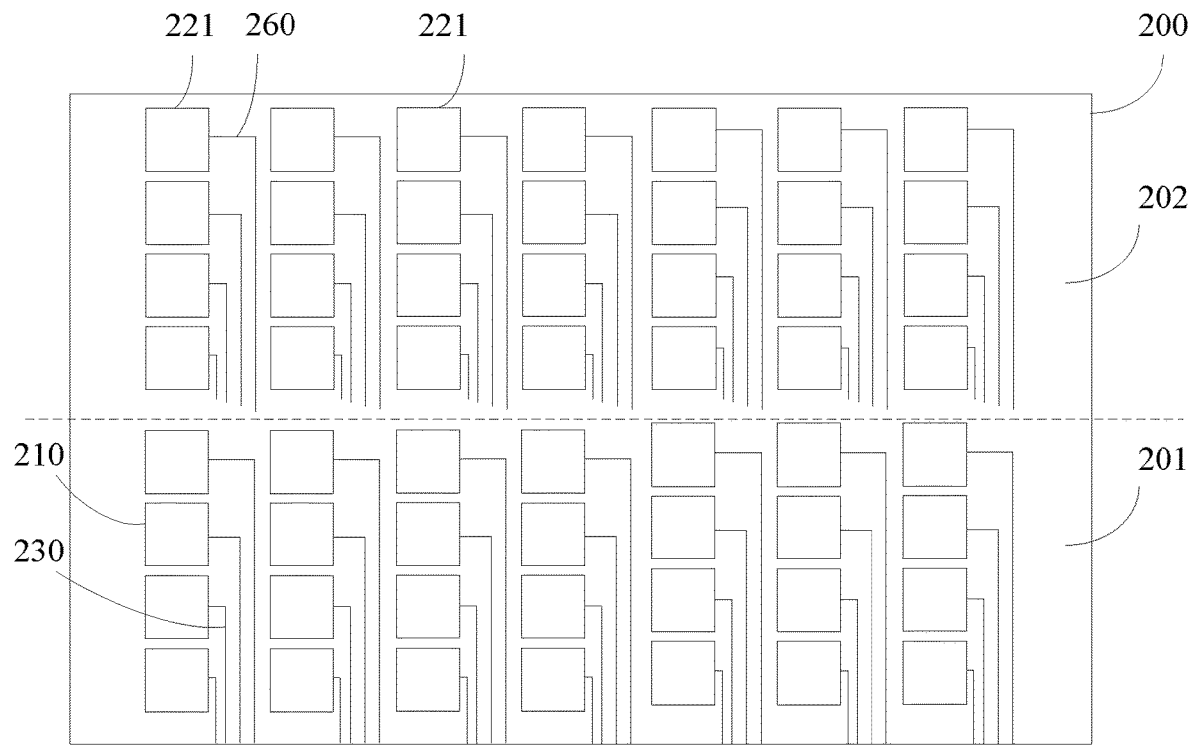
FIG. 5 is a schematic structural diagram of another first patterned layer according to an embodiment of the present disclosure.

FIG. 5 is a schematic structural diagram of another first patterned layer according to an embodiment of the present disclosure. As shown in FIG. 5, in addition to the first touch electrodes 210, first lead wires 230, and first sub-electrodes 221, the first patterned layer further includes a plurality of fourth lead wires 260. The plurality of fourth lead wires 260 are connected to the plurality of first sub-electrodes 221 in a one-to-one correspondence. The plurality of fourth lead wires 260 all extend along an arrangement direction of a first area 201 and a second area 202 toward a side (that is, the bottom side in FIG. 5) where the first area 201 is located.

As shown in FIG. 5, to avoid short circuits between the fourth lead wires 260 and the first lead wires 230, the end of a fourth lead wire 260 which is not connected to the first sub-electrode 221 is at a distance away from the border line between the first area and the second area, and is in a floating state.

Figure 6:
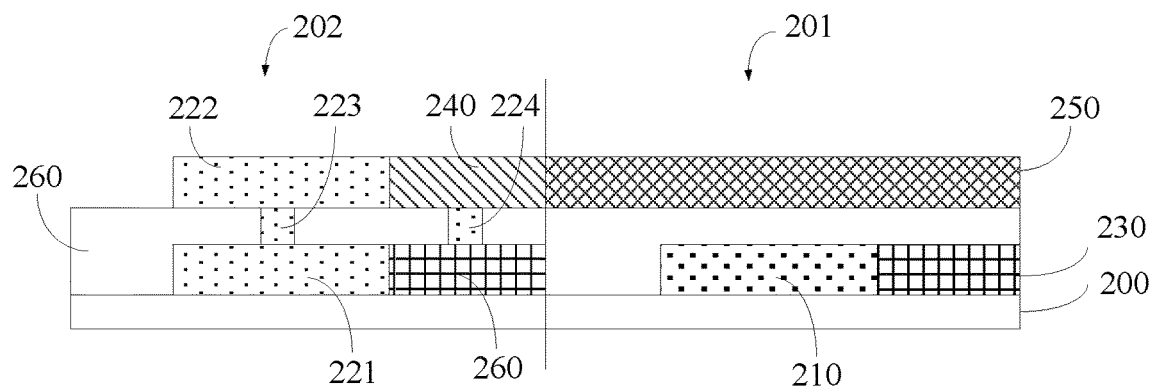
FIG. 6 is a partial schematic sectional view of another touch substrate according to an embodiment of the present disclosure.

FIG. 6 is a partial schematic sectional view of another touch substrate according to an embodiment of the present disclosure, and shows a relationship among layers including touch electrodes and lead wires in a first area and a second area. Similarly, FIG. 6 exemplarily shows one first touch electrode 210 and one second touch electrode 220 that are adjacent in an arrangement direction of a first area 201 and a second area 202. For conciseness, FIG. 6 is illustrated exemplarily by lead wires which do not include any bending portion As shown in FIG. 6, an orthographic projection of a fourth lead wire 260 onto a substrate 200 and an orthographic projection of a second lead wire 240 onto the substrate 200 overlap, and the fourth lead wires 260 and the second lead wires 240 are connected by vias 224. In this way, for each second touch electrode, two lead wires are disposed correspondingly, which equals to that the thickness of the lead wire is increased, so that the sectional area of the lead wire is increased. As such, the resistance of the lead wires located in the second area 202 can be further reduced.

Figure 7:
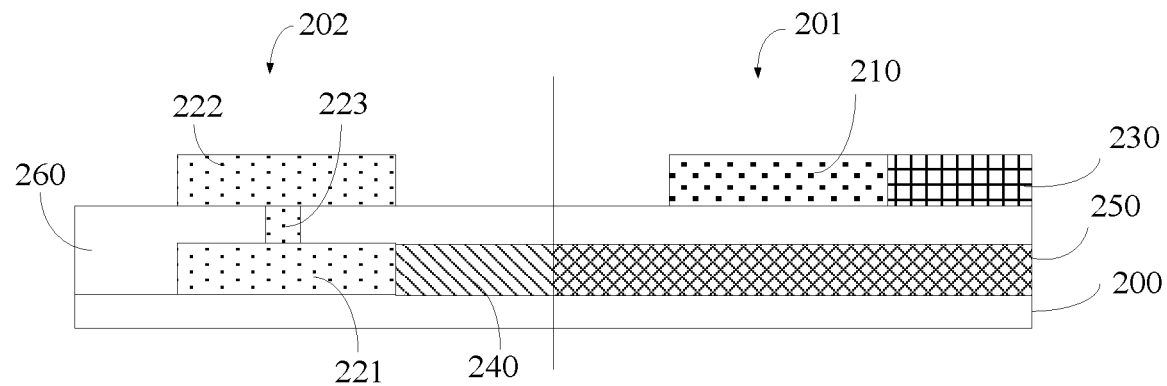
FIG. 7 is a schematic structural diagram of another touch substrate according to an embodiment of the present disclosure.

FIG. 7 is a schematic structural diagram of another touch substrate according to an embodiment of the present disclosure. In the touch substrate shown in FIG. 7, first touch electrodes 210, first lead wires 230, and second sub-electrodes 222 are arranged in a common layer, that is, are arranged in a same layer. Herein, by structures being arranged in a same layer, it means that, the structures are located on a same side of a same layer, or the structures are formed by using one patterning process, or surfaces, near a substrate, of the structures are in contact with a same layer. As shown in FIG. 7, a first patterned layer includes first sub-electrodes 221, second lead wires 240, and third lead wires 250. The first sub-electrodes 221 are connected to the third lead wires 250 by the second lead wires 240. A second patterned layer includes the second sub-electrodes 222, the first touch electrodes 210, and the first lead wires 230. The second sub-electrodes 222 are connected to the first sub-electrodes 221 by vias 223, and the first touch electrodes 210 are connected to the first lead wires 230.

In the embodiments shown in FIG. 2, FIG. 6, and FIG. 7, one layer of sub-electrodes of two layers of sub-electrodes and the first touch electrodes 210 are disposed in a same layer, and the other layer of sub-electrodes of the two layers of sub-electrodes and the third lead wires 250 are disposed in a same layer. The first touch electrodes 210 and the one layer of sub-electrodes can be manufactured at the same time, and the other layer of sub-electrodes and the third lead wires 250 are manufactured at the same time, thereby reducing procedures.

In another embodiment of the present disclosure, the first touch electrodes may be arranged in a different layer from the first sub-electrodes and the second sub-electrodes. The first touch electrodes and the second touch electrodes (including the first sub-electrodes and the second sub-electrodes) are located in different areas. That is, the first touch electrodes are located in a first area, and the second touch electrodes are located in a second area. The first area and the second area are arranged side by side in a direction parallel to the substrate. Therefore, an orthographic projection of the first touch electrode onto the substrate and an orthographic projection of the second touch electrode onto the substrate do not overlap.

Figure 8:
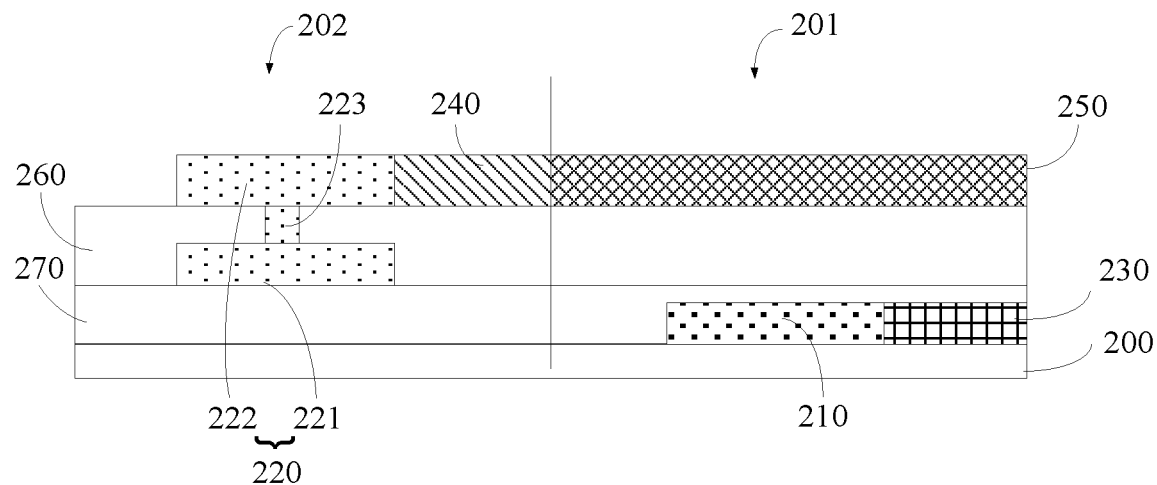
FIG. 8 is a schematic structural diagram of another touch substrate according to an embodiment of the present disclosure.

For example, as shown in FIG. 8, the first patterned layer, the second patterned layer, and a third patterned layer are sequentially provided on a substrate 200. An insulating layer is disposed between adjacent patterned layers. Herein, the first touch electrodes 210 and the first lead wires 230 are disposed in the first patterned layer. The first sub-electrodes 221 are disposed in the second patterned layer. The second sub-electrodes 222 are disposed in the third patterned layer. The first sub-electrodes 221 are connected to the second sub-electrodes 222 by the vias 223. The structure shown in FIG. 8 is only an example. In other possible implementations, the first touch electrodes and the first lead wires may be disposed in the third patterned layer, the first sub-electrodes may be disposed in the first patterned layer, and the second sub-electrodes may be disposed in the second patterned layer. Alternatively, the first touch electrodes and the first lead wires may be disposed in the second patterned layer, the first sub-electrodes may be disposed in the first patterned layer, and the second sub-electrodes may be disposed in the third patterned layer.

Figure 9:
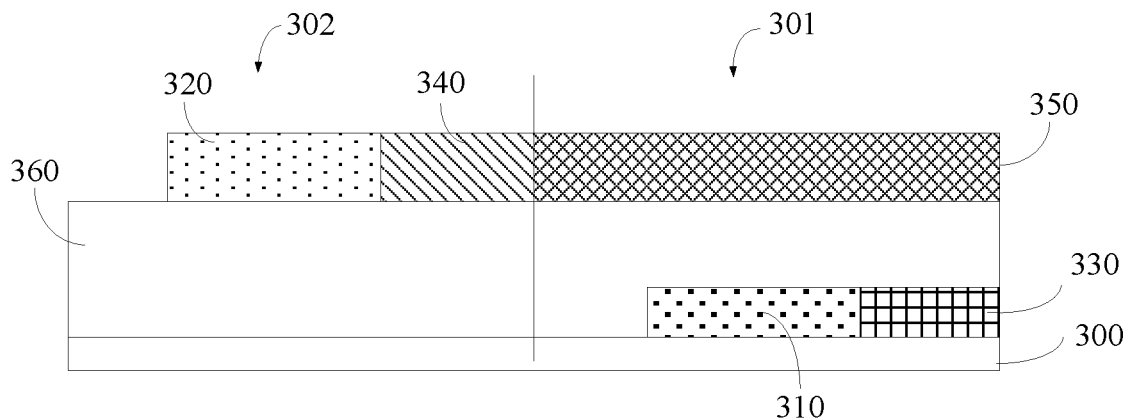
FIG. 9 is a schematic structural diagram of another touch substrate according to an embodiment of the present disclosure.

FIG. 9 is a schematic structural diagram of another touch substrate according to an embodiment of the present disclosure. In the embodiment shown in FIG. 9, second touch electrodes 320 are single-layer electrodes. The single-layer electrode has a simpler structure, so that a quantity of film layers of the touch substrate can be reduced.

As shown in FIG. 9, a first patterned layer and a second patterned layer are formed on the substrate 300 of the touch substrate. The first patterned layer and the second patterned layer are separated by an insulating layer 360. In this embodiment, the first patterned layer includes first touch electrodes 310 and first lead wires 330 and the second patterned layer includes the second touch electrodes 320, second lead wires 340, and third lead wires 350. A connection relationship between the lead wires and touch electrodes is the same as that in the touch substrate shown in FIG. 1. Details are omitted herein.

Figure 10:
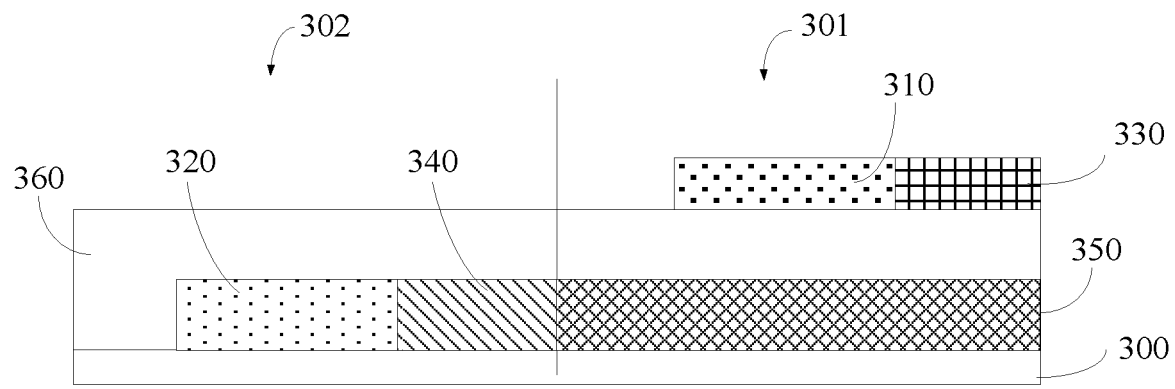
FIG. 10 is a schematic structural diagram of another touch substrate according to an embodiment of the present disclosure.

FIG. 10 is a schematic structural diagram of another touch substrate according to an embodiment of the present disclosure. In the touch panel shown in FIG. 10, all the first touch electrodes 310 and second touch electrodes 320 are single-layer structures and are disposed in different layers.

As shown in FIG. 10, the second touch electrodes 320, second lead wires 340, and third lead wires 350 are located in the first patterned layer, and the first touch electrodes 310 and first lead wires 330 are located in the second patterned layer. An arrangement manner of the lead wires and touch electrodes is the same as that in the touch substrate shown in FIG. 1. Details are omitted herein.

The first touch electrodes 310 and the second touch electrodes 320 are disposed in different layers, so that the first touch electrodes 310 and the second touch electrodes 320 can be separately manufactured, and it is convenient to manufacture two types of touch electrodes with different thicknesses.

Optionally, the thickness of a second touch electrode 320 may be greater than the thickness of the first touch electrode 310. The second touch electrode 320 may be disposed to be thicker to help reduce the resistance of the second touch electrode 320.

Figure 11:
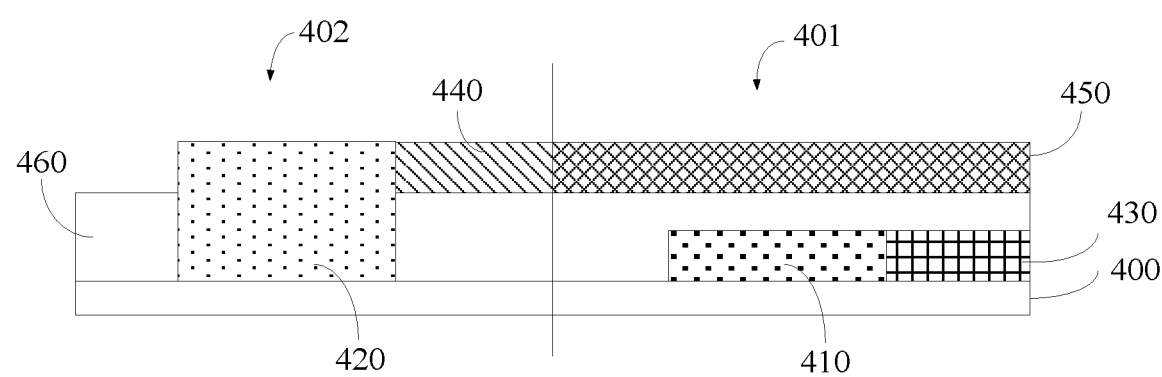
FIG. 11 is a schematic structural diagram of another touch substrate according to an embodiment of the present disclosure.

FIG. 11 is a schematic structural diagram of another touch substrate according to an embodiment of the present disclosure. In the touch substrate shown in FIG. 11, second touch electrodes 420 and first touch electrodes 410 are disposed in a same layer. When touch electrodes are disposed in a same layer, the manufacturing of the touch electrodes can be facilitated.

As shown in FIG. 11, a first patterned layer, an insulating layer 460, and a second patterned layer are formed on a substrate 400 of the touch substrate. Here, the first touch electrodes 410, first lead wires 430, and the second touch electrodes 420 are located in the first patterned layer. Second lead wires 440 and third lead wires 450 are located in the second patterned layer. In the first patterned layer, the thickness of a second touch electrode 420 is greater than the thickness of the first touch electrode 410, so that the second touch electrode 420 has lower resistance than the first touch electrode 410. The thickness of the insulating layer 460 is greater than the thickness of the first touch electrode 410 and is less than the thickness of the second touch electrode 420, so that in a first area 401, the insulating layer 460 can completely cover the first touch electrodes 410 and the first lead wires 430. In a second area 402, the second touch electrode 420 may be exposed from the insulating layer 460. The second lead wires 440 are connected to the parts, exposed from the insulating layer, of the second touch electrodes 420.

Figure 12:
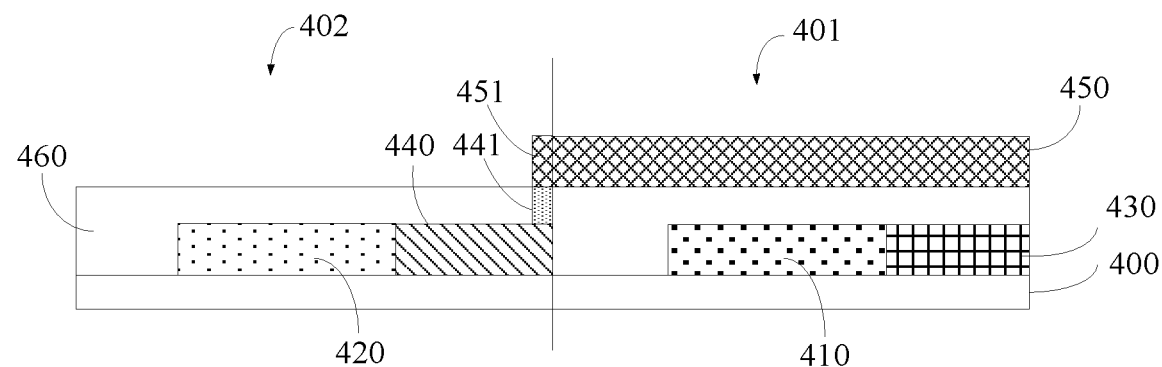
FIG. 12 is a schematic structural diagram of another touch substrate according to an embodiment of the present disclosure.

FIG. 12 is a schematic structural diagram of another touch substrate according to an embodiment of the present disclosure. In the touch substrate shown in FIG. 12, second touch electrodes 420 and first touch electrodes 410 are disposed in a same layer. On a substrate 400 of the touch substrate, a first patterned layer, an insulating layer 460, and a second patterned layer are formed. The first touch electrodes 410, first lead wires 430, second lead wires 440, and the second touch electrodes 420 are located in the first patterned layer. Third lead wires 450 are located in the second patterned layer. The third lead wires 450 and the second lead wires 440 are connected by vias 441. As shown in FIG. 11, the vias 441 are located in a second area 402. The insulating layer 460 is further provided with joints 451. The joints 451 are located in the second area 402 to connect the vias 441 and the third lead wires 450. Here, the joints 451 are parts extending from the third lead wires 450 to the second area 402.

In some other embodiments of the present disclosure, the vias 441 and the joints 451 may be disposed in a first area 401 to connect the second lead wires 440 and the vias 441 by the joints 451.

In another embodiment of the present disclosure, the third lead wires 450 may be disposed in the first patterned layer, and the first touch electrodes 410, the first lead wires 430, the second lead wires 440, and the second touch electrodes 420 are disposed in the second patterned layer.

In the touch substrate shown in FIG. 12, the thickness of a second touch electrode 420 may be the same as the thickness of the first touch electrode 410. The thickness of the second touch electrode 420 may be greater than the thickness of the first touch electrode 410.

In the touch substrates shown in FIG. 1 to FIG. 12, the plurality of first lead wires and the plurality of first touch electrodes are disposed in a same layer, thereby facilitating the manufacturing of the first touch electrodes and the first lead wires. In another embodiment, the first lead wires and the first touch electrodes may be disposed in different layers, and the first lead wires and the first touch electrodes are connected by vias.

Optionally, the plurality of second lead wires may be disposed in a same layer as the plurality of third lead wires or the plurality of first touch electrodes. For example, in the touch substrates shown in FIG. 1 to FIG. 11, the plurality of second lead wires and the plurality of third lead wires are disposed in a same layer. In the touch substrate shown in FIG. 12, the plurality of second lead wires 440 and the plurality of first touch electrodes 410 are in a same layer. When the plurality of second lead wires and the plurality of third lead wires are disposed in a same layer, the plurality of second lead wires and the plurality of second touch electrodes can be disposed in a same layer (for example, as shown in FIG. 9). Alternatively, the plurality of second lead wires and the plurality of second touch electrodes may be disposed in different layers. When the plurality of second lead wires and the plurality of second touch electrodes are disposed in different layers, the plurality of second lead wires can be connected to the plurality of second touch electrodes by vias.

For example, the width of the third lead wire may be greater than the width of the second lead wire. The third lead wires and the second lead wires may be made of a same material. In this embodiment, the width is the size in a direction that is perpendicular to an extending direction of a lead wire and is in parallel to the surface of the substrate. The third lead wires and the second lead wires are made of a same material, and the third lead wire is wider than the second lead wire. Therefore, a unit length of the third lead wires has a lower resistance than a unit length of the second lead wires. As the third lead wires and the second lead wires are made of a same material, they can be manufactured at the same time.

As the third lead wires are arranged in the first area, and the touch electrodes distributed in the first area are disposed in a different layer from the third lead wires, the third lead wire has a relatively large wiring space and can be set to be relatively wide. As shown in FIG. 1, the plurality of third lead wires 130 are distributed side by side at intervals in the first area 101.

The width of the first lead wire and the width of the second lead wire may be no more than 20% of the width of the touch electrode. Here, the touch electrode is rectangular, and the width of the touch electrode refers to the length of a relatively short side of the touch electrode. Taking the touch substrate shown in FIG. 1 as an example, the touch electrode is a square, for example, a square with a size of 5 mm*5 mm. In this case, the width of the touch electrode is the length of any side of the square. If the touch electrode is a rectangle, the width of the touch electrode is the length of a relatively short side of the rectangle.

The first lead wires 130 and the second lead wires 140 need to be arranged between a plurality of touch electrodes. Therefore, if the first lead wires 130 and the second lead wires 140 are set to have relatively large width, gaps between the lead wires are relatively small. As a result, manufacturing becomes more difficult, and the lead wires are prone to short circuits. The third lead wires 150 have a relatively large wiring space. Even if the width thereof is set to be relatively large, it can be ensured that a relatively large gap is kept between adjacent third lead wires 150. Therefore, the width of the third lead wire 150 can be greater than 20% of the width of the touch electrode, thereby increasing the sectional area of the third lead wire 150 and reducing the resistance of the third lead wire 150.

Optionally, the thickness of the third lead wire may be the same as the thickness of the second lead wire. When the second lead wires and the third lead wires are in a same layer and made of a same material, the manufacturing of them is facilitated. Alternatively, in some embodiments, the thickness of the third lead wire may be not the same as the thickness of the second lead wire. For example, the thickness of the third lead wire may be greater than the thickness of the second lead wire, thereby further increasing the sectional area of the third lead wire and reducing the resistance.

For example, referring to FIG. 1, projections of the third lead wires 150 onto the substrate 100 partially overlap with the projections of first touch electrodes 110. In this case, the third lead wires 150 and the first touch electrode 110 both need to be made of a transparent conductive material.

For example, the first touch electrodes may be made of the same transparent conductive material as the first lead wires. Therefore, the first touch electrodes and the first lead wires can be manufactured at the same time. The second touch electrodes may be made of the same transparent conductive material as the second lead wires. Therefore, when the second touch electrodes and the second lead wires are disposed in a same layer, for example, in the touch substrate shown in FIG. 9, the second touch electrodes 320 and the second lead wires 340 can be manufactured at the same time.

For example, in the touch substrates shown in FIG. 1 to FIG. 12, the plurality of touch electrodes and the plurality of lead wires may all be made of a transparent conductive material. The transparent conductive material has relatively high light transmittance, thereby helping improve a display effect.

For example, the transparent conductive material may include indium tin oxide (ITO) or indium-doped zinc oxide (IZO).

Optionally, the third lead wires may be made of a metal material. The second lead wires are made of a transparent conductive material. The metal material has lower sheet resistance (the value obtained from dividing the resistivity by a film thickness of the lead when the length and width of a lead are equal) than the transparent conductive material. Therefore, a unit length of a metal lead has a lower resistance than a unit length of lead made of the transparent conductive material. By manufacturing the third lead wires with metal material, the total resistance of the lead wires connecting the second touch electrodes and a touch IC can be reduced.

For example, the metal material may include any one or an alloy of any two of copper, gold, and silver.

In the embodiments shown in FIG. 1 to FIG. 12, the third lead wires and the first touch electrodes are not disposed in a same layer. When the third lead wires are manufactured of a metal material, it is not necessary to increase the width of the third lead wire. That is, the third lead wire may have a relatively narrow width. As such, if the touch precision can be satisfied, the third lead wires and the first touch electrodes may be in a same layer. That is, the third lead wires can be arranged between the first touch electrodes.

Figure 13:
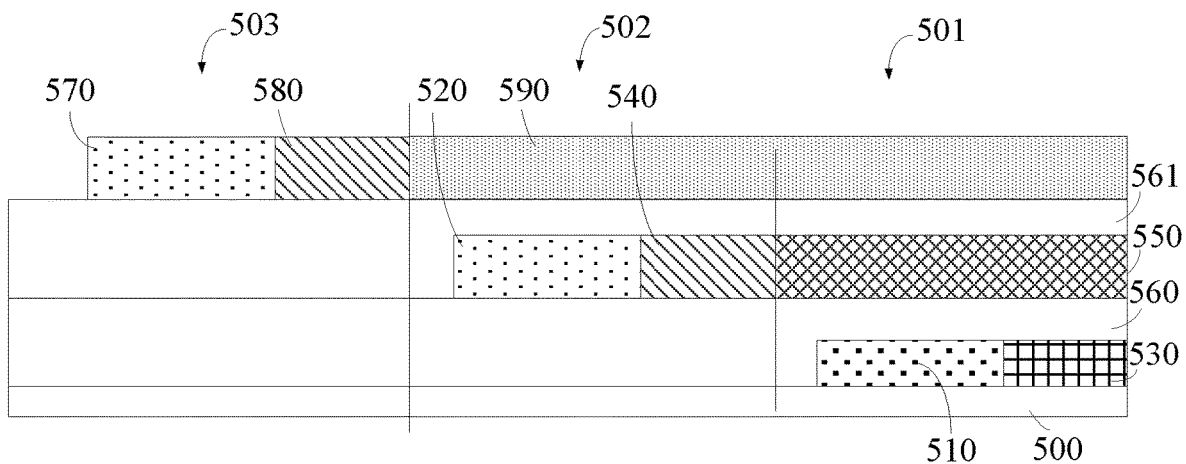
FIG. 13 is a schematic structural diagram of another touch substrate according to an embodiment of the present disclosure.

Optionally, the substrate may further have a third area. As shown in FIG. 13, a substrate 500 has a first area 501, a second area 502, and a third area 503 arranged side by side. The plurality of touch electrodes include a plurality of first touch electrodes 510, a plurality of second touch electrodes 520, and a plurality of third touch electrodes 570. A plurality of lead wires include a plurality of first lead wires 530, a plurality of second lead wires 540, a plurality of third lead wires 550, a plurality of fifth lead wires 580, and a plurality of sixth lead wires 590. An arrangement manner of the first touch electrodes 510, the second touch electrodes 520, the first lead wires 530, the second lead wires 540, and the third lead wires 550 is the same as the touch substrate shown in FIG. 9. The touch substrate shown in FIG. 13 further includes an insulating layer 561. The insulating layer 561 is disposed on the insulating layer 560, and the insulating layer 561 covers the second touch electrodes 520, the second lead wires 540, and the third lead wires 550. The plurality of third touch electrodes 570, the plurality of fifth lead wires 580, and the plurality of sixth lead wires 590 are located in a third patterned layer. The third patterned layer is disposed on the insulating layer 561. The plurality of third touch electrodes 570 and the plurality of fifth lead wires 580 are located in the third area 503. The plurality of third touch electrodes 570 are connected to the plurality of fifth lead wires 580 in a one-to-one correspondence. The plurality of sixth lead wires 590 are located in the first area 501 and the second area 502. The plurality of fifth lead wires 580 are connected to the plurality of sixth lead wires 590 in a one-to-one correspondence. A unit length of the sixth lead wires 590 has a lower resistance than a unit length of the fifth lead wires 580. Compared with the structure shown in FIG. 9, the structure in FIG. 13 is applicable to the manufacturing of a touch substrate with a larger area.

The structure shown in FIG. 13 is only for exemplary purpose. The first patterned layer and the second patterned layer also may be arranged in any manner of FIG. 2 to FIG. 12. The third touch electrodes 570 may also be disposed as double-layer electrodes. In another embodiment, the substrate may further have more areas such as a fourth area, a fifth area and the like. The fourth area and the fifth area may be sequentially arranged in a direction from the first area toward the second area, along the arrangement direction thereof. For the structure of the touch electrodes in the fourth area and the fifth area and the arrangement manner of lead wires connected to the touch electrodes, a reference can be made to the related previous description of the third area. Details are omitted herein.

An embodiment of the present disclosure further provides a touch device, which includes any of the touch substrates shown in FIG. 1 to FIG. 13.

Figure 14:
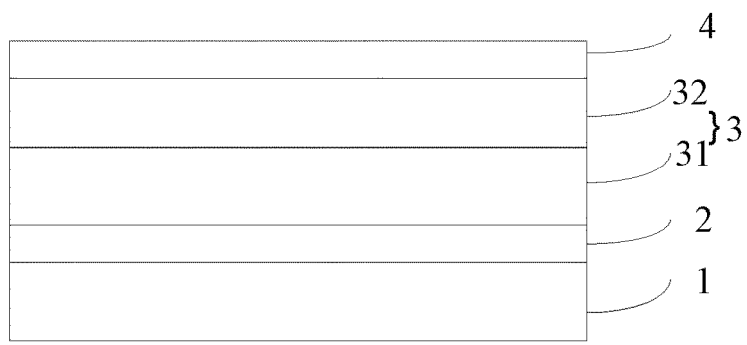
FIG. 14 is a schematic structural diagram of a touch device according to an embodiment of the present disclosure.

FIG. 14 is a schematic structural diagram of a touch device according to an embodiment of the present disclosure. As shown in FIG. 14, the touch device may include an array substrate 1, a liquid crystal layer 2, a touch substrate 3, and a polarizer 4. The touch substrate 3 includes a substrate 31 and a touch layer 32. The touch layer 32 includes the layered structure described in the foregoing embodiments which having a plurality of touch electrodes and a plurality of lead wires.

Optionally, the substrate 31 may be a color film substrate. The array substrate 1 and the color film substrate are aligned. The liquid crystal layer 2 is sandwiched between the array substrate 1 and the color film substrate. The polarizer 4 is disposed on the touch substrate 3. Optionally, the substrate 31 may be a glass substrate. When the substrate 31 is a glass substrate, the glass substrate can be bonded to the color film substrate.

For example, the touch device may be any product or part having a touch function, such as a mobile phone, a tablet computer, a television, a display, a notebook computer, a digital frame, a navigation device or the like.

Figure 15:
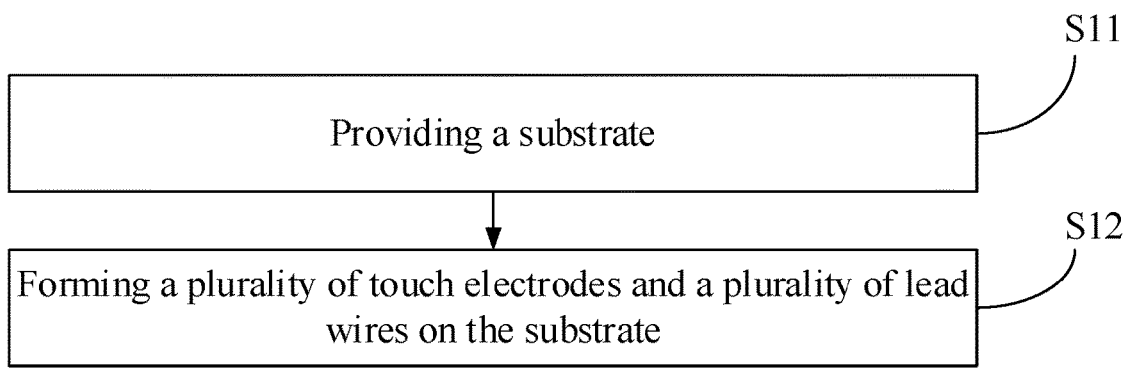
FIG. 15 is a flowchart of a method for manufacturing a touch substrate according to an embodiment of the present disclosure.

FIG. 15 is a flowchart of a method for manufacturing a touch substrate according to an embodiment of the present disclosure. The method is used to manufacture the touch substrates shown in FIG. 1 to FIG. 13. As shown in FIG. 15, the manufacturing method includes the following steps S11 and S12.

In step S11, a substrate is provided.

Here, the substrate has a first area and a second area arranged side by side.

In step S12, a plurality of touch electrodes and a plurality of lead wires are formed on the substrate.

Here, the plurality of touch electrodes are arranged in an array on the substrate. The plurality of touch electrodes include a plurality of first touch electrodes located in the first area and second touch electrodes located in the second area. The plurality of lead wires extend along an arrangement direction of the first area and the second area. The plurality of lead wires include a plurality of first lead wires, a plurality of second lead wires, and a plurality of third lead wires. The plurality of first lead wires are located in the first area and are connected to the first touch electrodes in a one-to-one correspondence. The plurality of second lead wires are located in the second area and are connected to the second touch electrodes in a one-to-one correspondence. The plurality of third lead wires are located in the first area and are disposed in a different layer from the first touch electrodes and are insulated from the first touch electrodes. The plurality of third lead wires are connected to the plurality of second lead wires in a one-to-one correspondence. A unit length of the third lead wires has a lower resistance than a unit length of the second lead wires.

When being disposed in the first area, the third lead wires are located in a different layer from the first touch electrodes in the first area and are insulated from the first touch electrodes. The third lead wires are connected in a one-to-one correspondence to the second lead wires which are connected with the second touch electrodes in the second area. As a unit length of the third lead wires has a lower resistance than a unit length of the second lead wires, the resistance of the lead wires connecting the second touch electrodes and the touch IC can be reduced. As such, the touch IC can functionally recognize the position as touched, thereby improving the accuracy of touch detection of the touch substrate.

Figure 16:
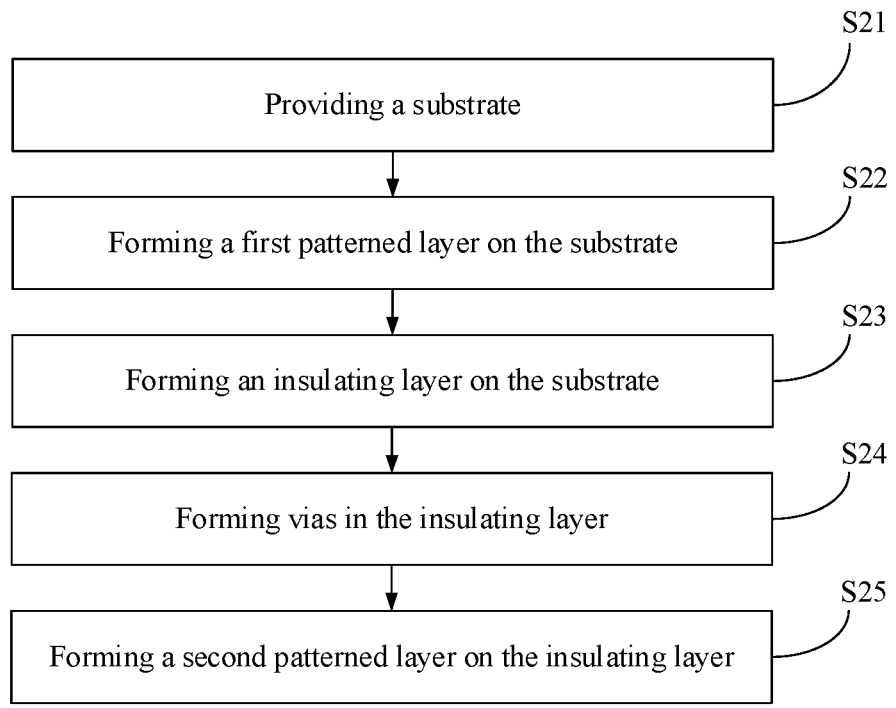
FIG. 16 is a flowchart of a method for manufacturing a touch substrate according to an embodiment of the present disclosure.

FIG. 16 is a flowchart of a method for manufacturing a touch substrate according to an embodiment of the present disclosure. The method is used to manufacture the touch substrate shown in FIG. 2. As shown in FIG. 16, the manufacturing method includes the following steps S21-S25.

In step S21, a substrate is provided.

In step S22, a first patterned layer is formed on the substrate.

Figure 17:
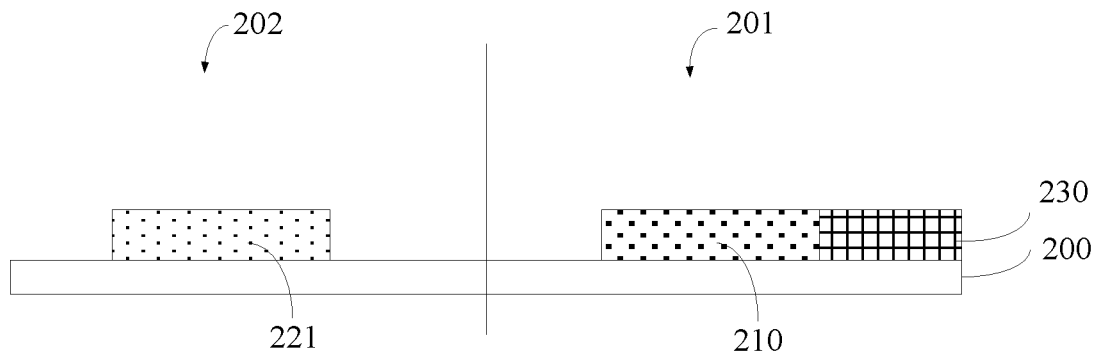
FIGS. 17 to 18 is a schematic diagram of a process of manufacturing a touch substrate according to an embodiment of the present disclosure.

As shown in FIG. 17, the first patterned layer on a substrate 200 includes a plurality of first touch electrodes 210, a plurality of first lead wires 230, and a plurality of first sub-electrodes 221 arranged in an array. The plurality of first touch electrodes 210 are connected to the plurality of first lead wires 230 in a one-to-one correspondence.

For example, the first patterned layer may be produced by forming a first film layer on the substrate, and performing a patterning process thereon.

The first film layer may be made of a transparent conductive material such as ITO or IZO.

In step S23, an insulating layer is formed on the substrate.

For example, the insulating layer may be a SiO2 layer. The SiO2 layer has good insulation performance and light transmittance.

Figure 18:
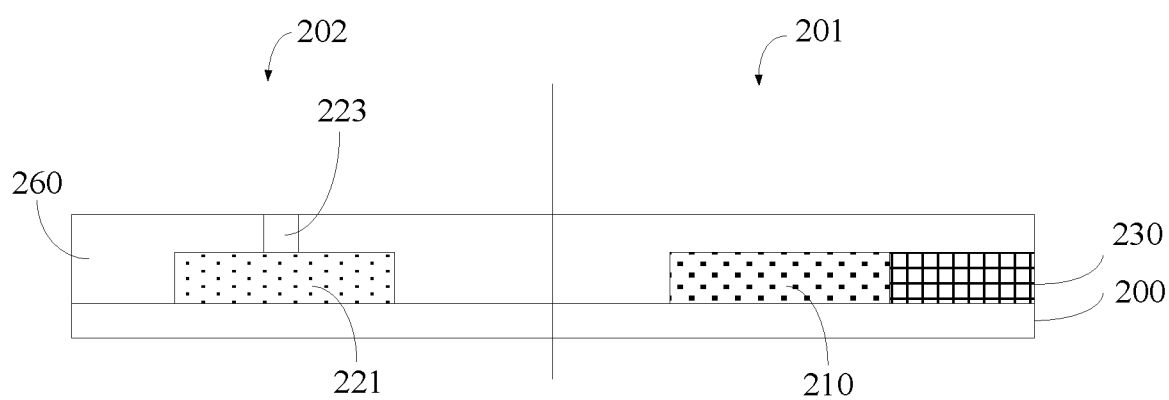

As shown in FIG. 18, the thickness of the insulating layer 260 is greater than the thickness of the first patterned layer. Here, the thickness of the insulating layer 260 refers to a maximum size of the insulating layer 260 in a direction perpendicular to a substrate 200. In this way, the insulating layer 260 can cover the first patterned layer.

In step S24, vias are formed in the insulating layer.

As shown in FIG. 18, there is a vias 223 in the insulating layer 260.

In step S25, a second patterned layer is formed on the insulating layer.

Reference can be made to FIG. 2 for the structure in which the second patterned layer has been formed. Here, the second patterned layer includes a plurality of second sub-electrodes 222, a plurality of second lead wires 240, and a plurality of third lead wires 250 arranged in an array. The plurality of second lead wires 240 are connected to the plurality of second sub-electrodes 222 in a one-to-one correspondence. Orthographic projections of the plurality of second sub-electrodes 222 and the plurality of first sub-electrodes 221 onto the substrate 200 overlap. The plurality of second sub-electrodes 222 and the plurality of first sub-electrodes 221 are connected in a one-to-one correspondence by vias 223 to form a plurality of second touch electrodes 220.

For example, the second patterned layer may be produced by forming a second film layer on the insulating layer 260, and performing a patterning process thereon.

The second film layer may be made of a transparent conductive material, for example, ITO or IZO.

Optionally, when manufacture the touch substrate by the manufacturing method shown in FIG. 16, the first patterned layer may further include a plurality of fourth lead wires 260. Orthographic projections of the plurality of fourth lead wires 260 and the plurality of second lead wires 240 onto the substrate 200 overlap. The plurality of fourth lead wires 260 and the plurality of second lead wires 240 are connected in a one-to-one correspondence by vias 224. In this way, the touch substrate shown in FIG. 6 can be manufactured. By adding the fourth lead wires 260, the total resistance of the lead wires connecting the second touch electrodes 220 and a touch IC can be reduced.

Through changing the patterns which can be formed via the patterning processes, the manufacturing method shown in FIG. 16 may further be used to manufacture the touch substrate shown in FIG. 7. For example, patterning processes can be changed, so that the first patterned layer includes the plurality of first sub-electrodes 221, the plurality of second lead wires 240, and the plurality of third lead wires 250, and the second patterned layer includes the plurality of second sub-electrodes 222, the plurality of first touch electrodes 210, and the plurality of first lead wires 230. In this way, the touch substrate shown in FIG. 6 can be manufactured.

When one of the two layers of sub-electrodes and the first touch electrodes are disposed in a same layer, and the other one of the two layers of sub-electrodes and the third lead wires are disposed in a same layer, the first touch electrodes and the first sub-electrodes can be manufactured at the same time conveniently, and the second sub-electrodes and the third lead wires can be manufactured in a same layer, thereby reducing procedures.

Figure 19:
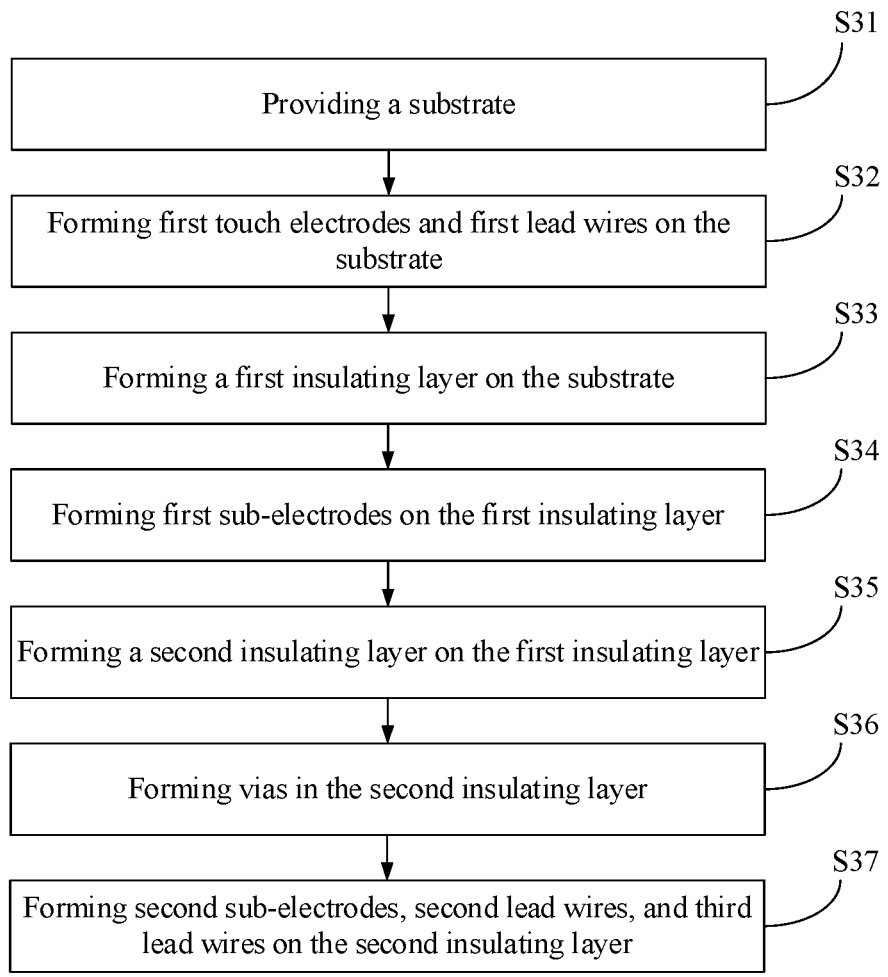
FIG. 19 is a flowchart of a method for manufacturing a touch substrate according to an embodiment of the present disclosure.

FIG. 19 is a flowchart of a method for manufacturing a touch substrate according to an embodiment of the present disclosure. The method is used to manufacture the touch substrate shown in FIG. 8. As shown in FIG. 19, the manufacturing method includes the following steps S31-S37.

In step S31, a substrate is provided.

In step S32, first touch electrodes and first lead wires are formed on the substrate.

Figure 20:
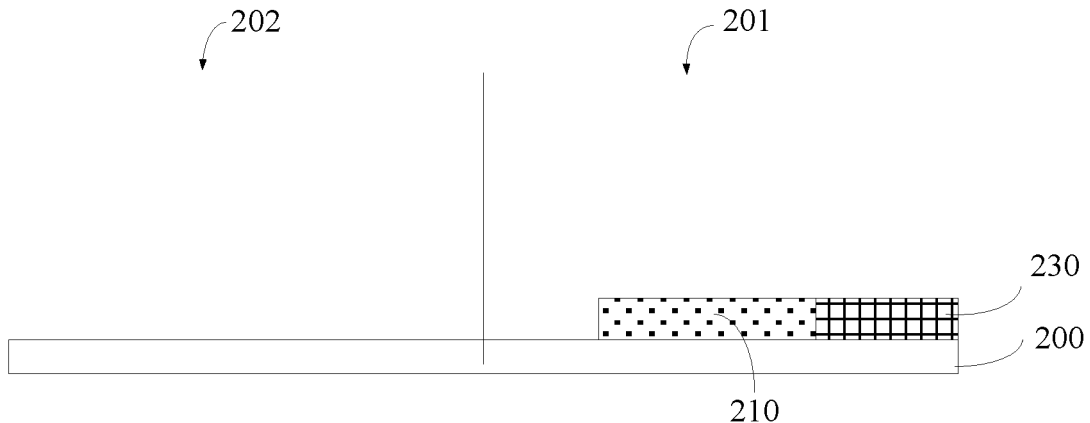
FIGS. 20 to 23 is a schematic diagram of a process of manufacturing a touch substrate according to an embodiment of the present disclosure.

As shown in FIG. 20, on a substrate 200, a first patterned layer is formed. The first patterned layer includes a plurality of first touch electrodes 210 and a plurality of first lead wires 230 arranged in an array. The plurality of first touch electrodes 210 are connected to the plurality of first lead wires 230 in a one-to-one correspondence.

In step S33, a first insulating layer is formed on the substrate.

For example, the first insulating layer may be a SiO$_2$ layer. The SiO$_2$ layer has good insulation performance and light transmittance.

Figure 21:
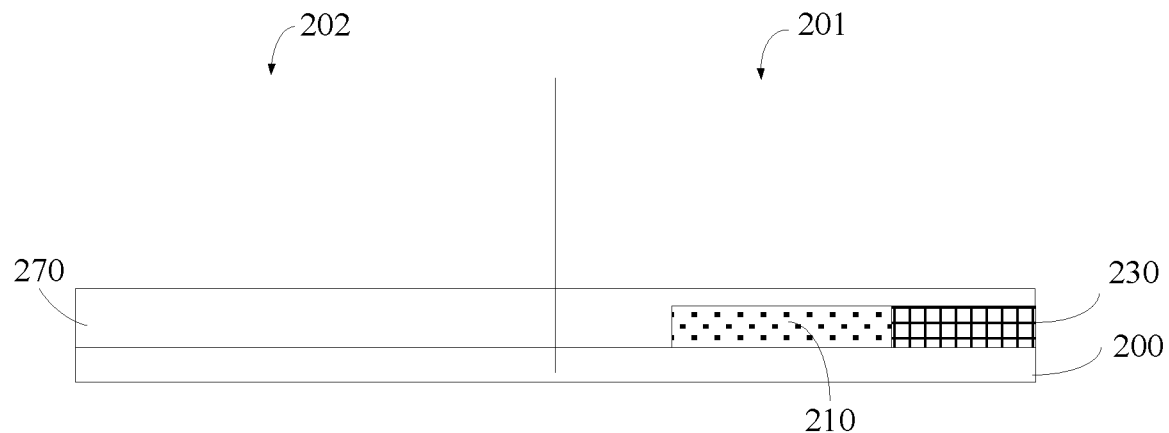

As shown in FIG. 21, a first insulating layer 270 covers the plurality of first touch electrodes 210 and the plurality of first lead wires 230.

In step S34, first sub-electrodes are formed on the first insulating layer.

Figure 22:
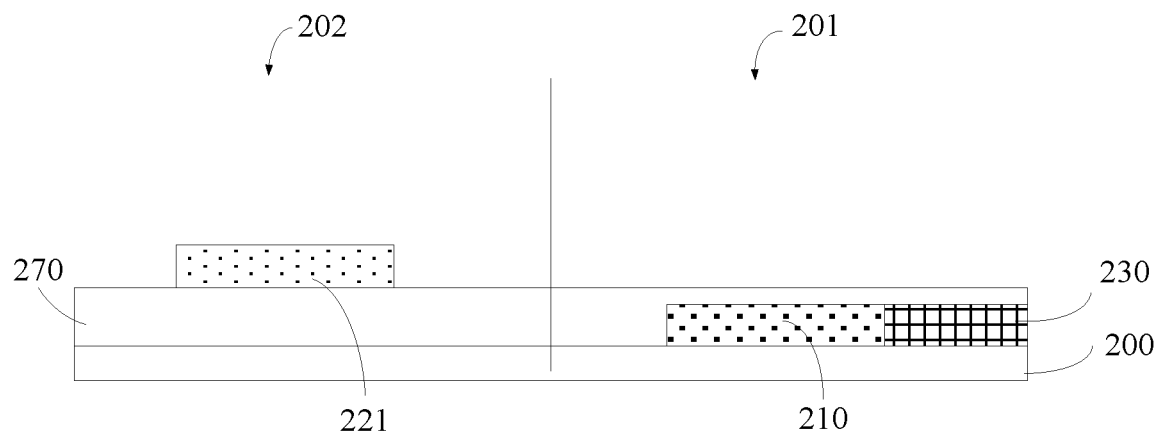

As shown in FIG. 22, a second patterned layer includes a plurality of first sub-electrodes 221 arranged in an array. The second patterned layer is formed on the first insulating layer 270.

In step S35, a second insulating layer is formed on the first insulating layer.

Figure 23:
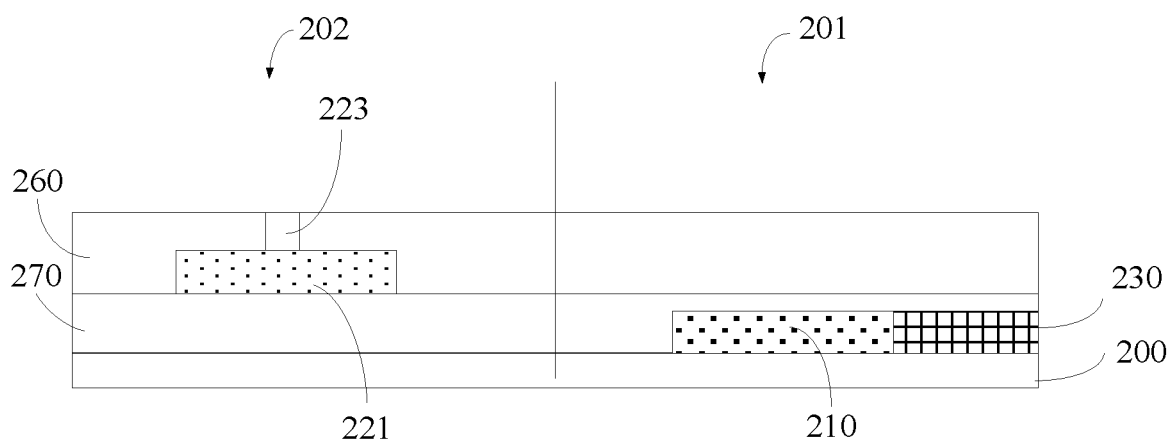

As shown in FIG. 23, the thickness of a second insulating layer 260 is greater than the thickness of the first sub-electrode 221. In this way, the second insulating layer 260 can cover the first sub-electrodes 221.

In step S36, vias are formed in the second insulating layer.

Figure 24:
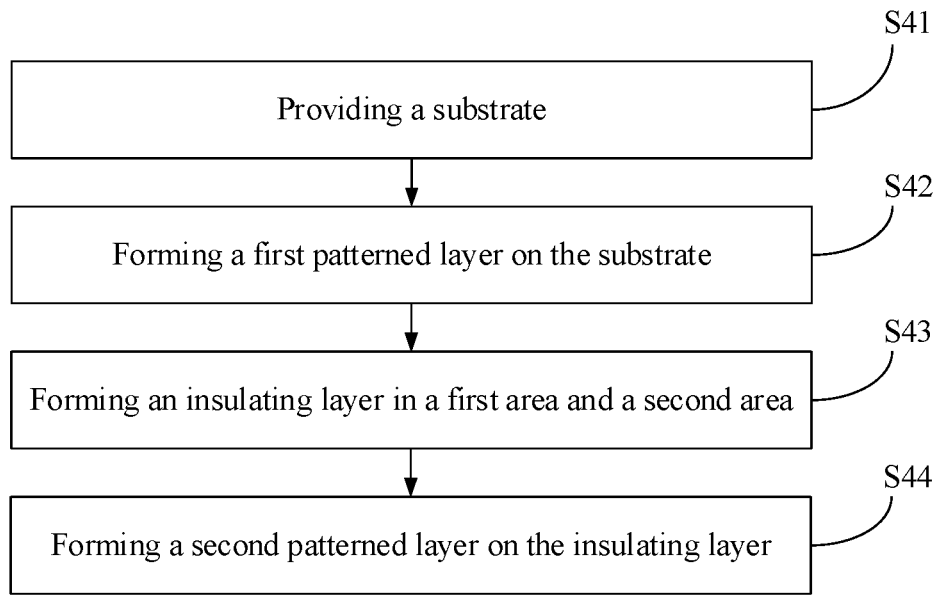
FIG. 24 is a flowchart of another method for manufacturing a touch substrate according to an embodiment of the present disclosure.

As shown in FIG. 24, vias 223 are formed in the second insulating layer 260.

In step S37, second sub-electrodes, second lead wires, and third lead wires are formed on the second insulating layer.

Reference can be made to FIG. 8 for the structure in which the second sub-electrodes, the second lead wires, and the third lead wires have been formed. The third patterned layer includes the second sub-electrodes 222, the second lead wires 240, and the third lead wires 250 arranged in an array. The plurality of second lead wires 240 and the plurality of second sub-electrodes 222 are connected in a one-to-one correspondence. Orthographic projections of the plurality of second sub-electrodes 222 and the plurality of first sub-electrodes 221 onto the substrate 200 overlap. The plurality of second sub-electrodes 222 and the plurality of first sub-electrodes 221 are connected in a one-to-one correspondence by vias 223 to form the plurality of second touch electrodes 220.

FIG. 24 is a flowchart of another method for manufacturing a touch substrate according to an embodiment of the present disclosure. The method may be used to manufacture the touch substrate shown in FIG. 9. As shown in FIG. 24, the manufacturing method includes the following steps S41-S44.

In step S41, a substrate is provided.

In step S42, a first patterned layer is formed on the substrate.

Figure 25:
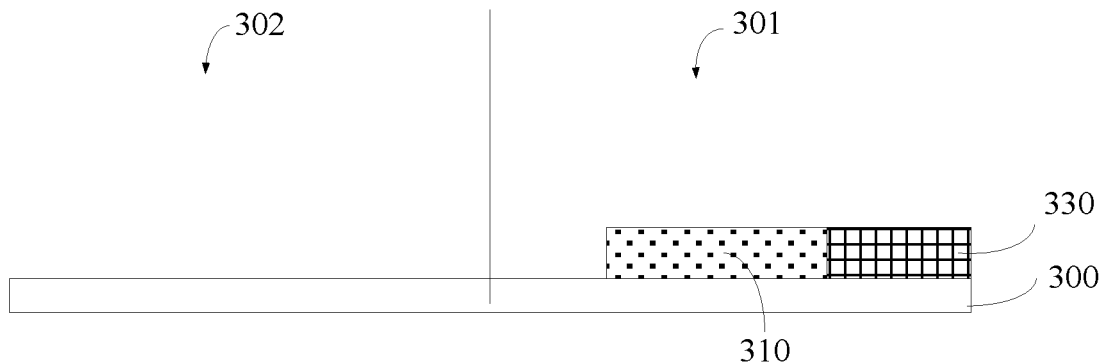
FIGS. 25 to 26 is a schematic diagram of a process of manufacturing a touch substrate according to an embodiment of the present disclosure.

As shown in FIG. 25, the first patterned layer includes a plurality of first touch electrodes 310 and a plurality of first lead wires 330.

For example, the first patterned layer may be produced by forming a first film layer on the substrate, and performing a patterning process thereon.

In step S43, an insulating layer is formed in a first area and a second area.

Figure 26:
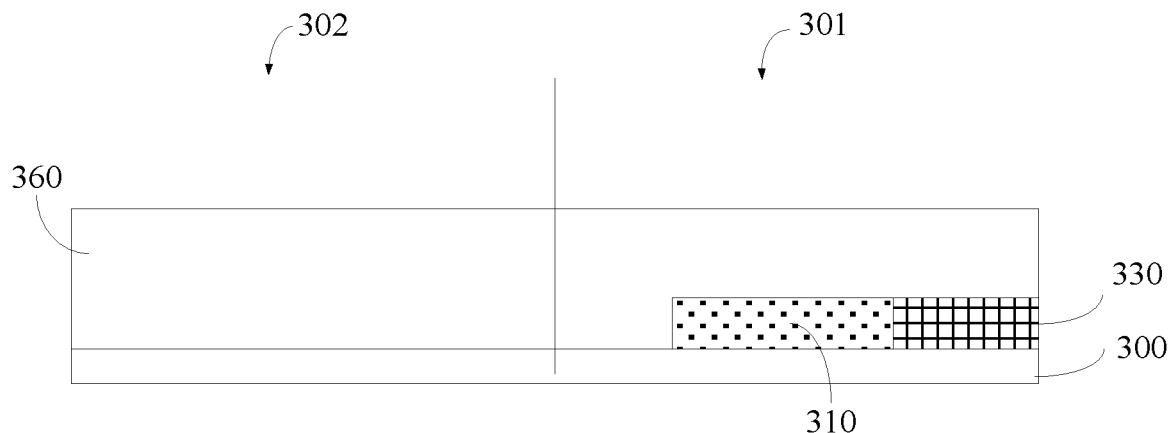

As shown in FIG. 26, the insulating layer 360 is disposed to completely cover the plurality of first touch electrodes 310 and the plurality of first lead wires 330.

In step S44, a second patterned layer is formed on the insulating layer.

Reference can be made to FIG. 9 for the structure in which the second patterned layer has been formed. The second patterned layer here includes a plurality of second touch electrodes 320, a plurality of second lead wires 340, and a plurality of third lead wires 350. The plurality of second lead wires 340 are connected to the plurality of second touch electrodes 320 in a one-to-one correspondence. The plurality of third lead wires 350 are connected to the plurality of second lead wires 340 in a one-to-one correspondence.

Through changing the patterns which can be formed via the patterning processes, the manufacturing method shown in FIG. 24 may further be used to manufacture the touch substrate shown in FIG. 10.

For example, patterning processes can be changed, so that the first patterned layer includes the plurality of second touch electrodes 320, the plurality of second lead wires 340, and the plurality of third lead wires 350. The plurality of second lead wires 340 are connected to the plurality of second touch electrodes 320 in a one-to-one correspondence. The second patterned layer includes the plurality of first touch electrodes 310 and the plurality of first lead wires 330. In this way, the touch substrate shown in FIG. 10 can be manufactured.

Figure 27:
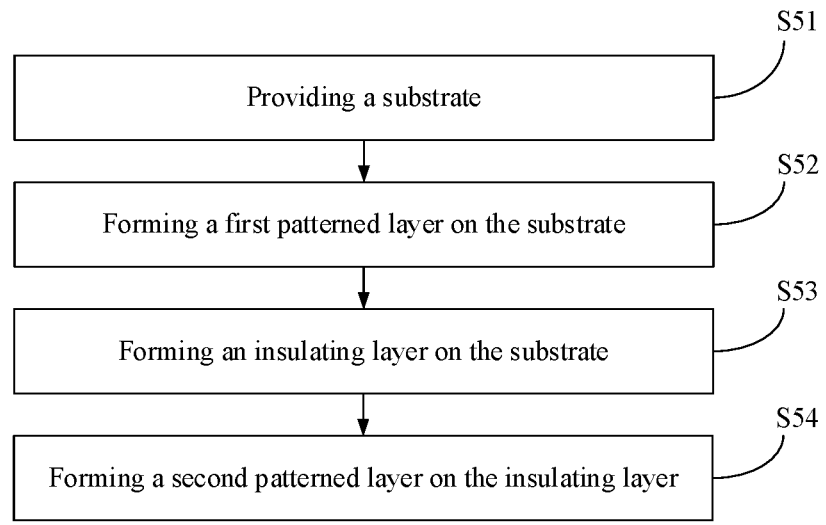
FIG. 27 is a flowchart of another method for manufacturing a touch substrate according to an embodiment of the present disclosure.

FIG. 27 is a flowchart of another method for manufacturing a touch substrate according to an embodiment of the present disclosure. The method is used to manufacture the touch substrate shown in FIG. 11. As shown in FIG. 27, the manufacturing method includes the following steps S51-S54.

In step S51, a substrate is provided.

In step S52, a first patterned layer is formed on the substrate.

Figure 28:
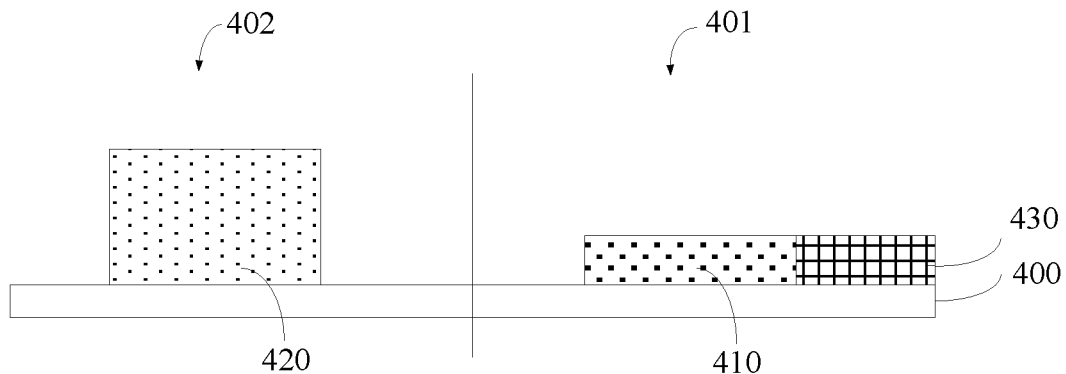
FIGS. 28 to 29 is a schematic diagram of a process of manufacturing a touch substrate according to an embodiment of the present disclosure.

As shown in FIG. 28, the first patterned layer includes a plurality of first touch electrodes 410, a plurality of second touch electrodes 420, and a plurality of first lead wires 430. The thickness of the second touch electrodes 420 is greater than the thickness of the first touch electrode 410. The plurality of first lead wires 430 are located in a first area 401 and are connected to the first touch electrodes 410 in a one-to-one correspondence.

For example, the first patterned layer may be produced by forming a first film layer on the substrate 400, and performing a patterning process thereon. During the patterning process, photoresist can be first formed on the first film layer. A halftone mask is used to expose the photoresist. After the photoresist is developed, a photoresist patterned layer can be formed on the first film layer. The thickness of an area, corresponding to the second touch electrodes 420, of the photoresist patterned layer is greater than the thickness of an area, corresponding to the first touch electrodes 410, of the photoresist patterned layer. Dry etching, such as electron beam etching, is then performed on the first film layer. As the thickness of an area, corresponding to the second touch electrodes 420, of the photoresist patterned layer is relatively large, during etching, the first film layer is etched by a relatively small thickness, so that the second touch electrodes 420 with a relatively large thickness can be formed. The thickness of an area, corresponding to the first touch electrodes 410, of the photoresist patterned layer is relatively small, therefore, during etching, the first film layer is etched by a relatively large thickness, so that the first touch electrodes 410 with a relatively small thickness can be formed.

In step S53, an insulating layer is formed on the substrate.

Figure 29:
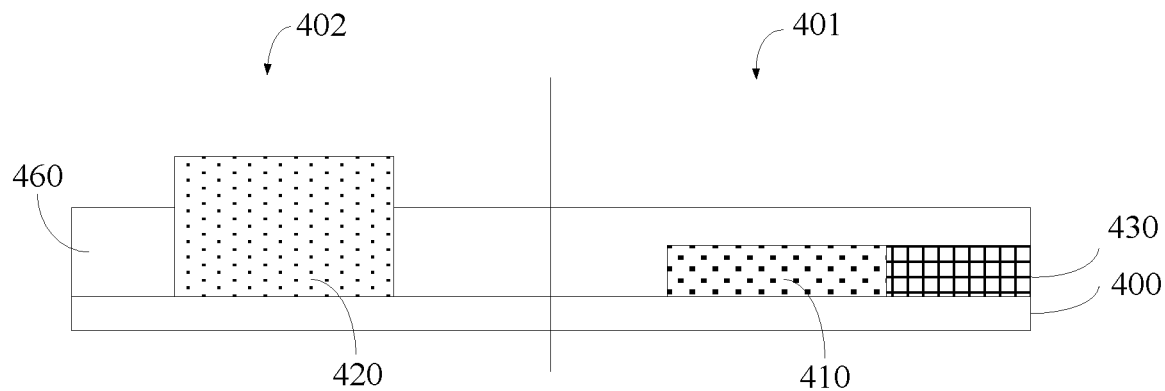

As shown in FIG. 29, the thickness of the insulating layer 460 is less than the thickness of the second touch electrodes 420 and is greater than the thickness of the first touch electrodes 410. Therefore, in the first area 401, the insulating layer 460 can completely cover the first touch electrodes 410 and the first lead wires 430. In the second area 402, the second touch electrodes 420 may be exposed from the insulating layer 460.

In step S54, a second patterned layer is formed on the insulating layer.

Reference can be made to FIG. 11 for the structure in which the second patterned layer has been formed. Here, the second patterned layer includes a plurality of second lead wires 440 and a plurality of third lead wires 450. The plurality of second lead wires 440 are located in the second area 402 and are connected to the second touch electrodes 420 in a one-to-one correspondence. The plurality of third lead wires 450 are connected to the plurality of second lead wires 440 in a one-to-one correspondence.

Figure 30:
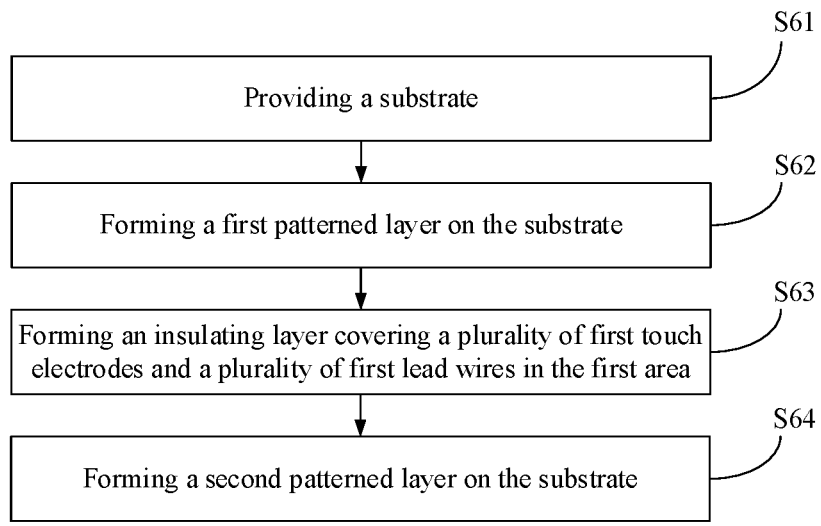
FIG. 30 is another method for manufacturing a touch substrate according to an embodiment of the present disclosure.

FIG. 30 is another method for manufacturing a touch substrate according to an embodiment of the present disclosure. The method can be similarly used to manufacture the touch substrate shown in FIG. 11. As shown in FIG. 30, the manufacturing method includes the following steps S61-S64.

In step S61, a substrate is provided.

In step S62, a first patterned layer is formed on the substrate.

Figure 31:
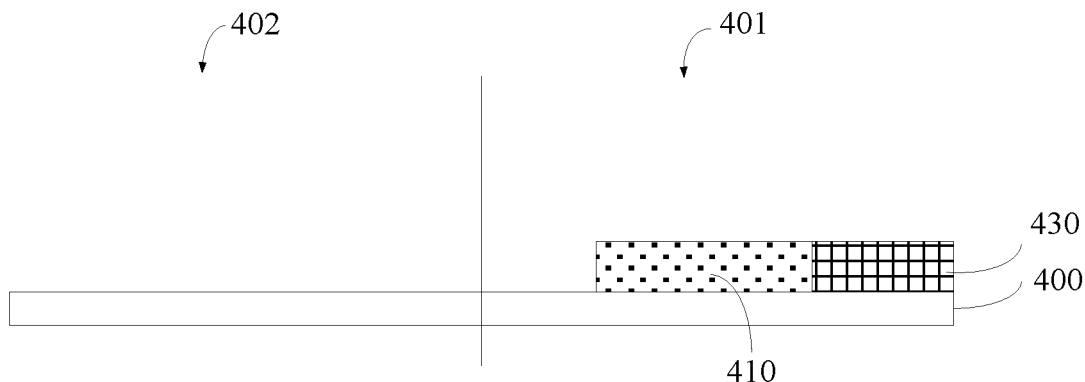
FIGS. 31 to 34 is a schematic diagram of a process of manufacturing a touch substrate according to an embodiment of the present disclosure.

As shown in FIG. 31, the first patterned layer includes a plurality of first touch electrodes 410 and a plurality of first lead wires 430. The plurality of first lead wires 430 are located in a first area 401 and are connected to the first touch electrodes 410 in a one-to-one correspondence.

For example, the first patterned layer may be produced by forming a first film layer on the substrate, and performing a patterning process thereon.

In step S63, an insulating layer covering a plurality of first touch electrodes and a plurality of first lead wires is formed in the first area.

Figure 32:
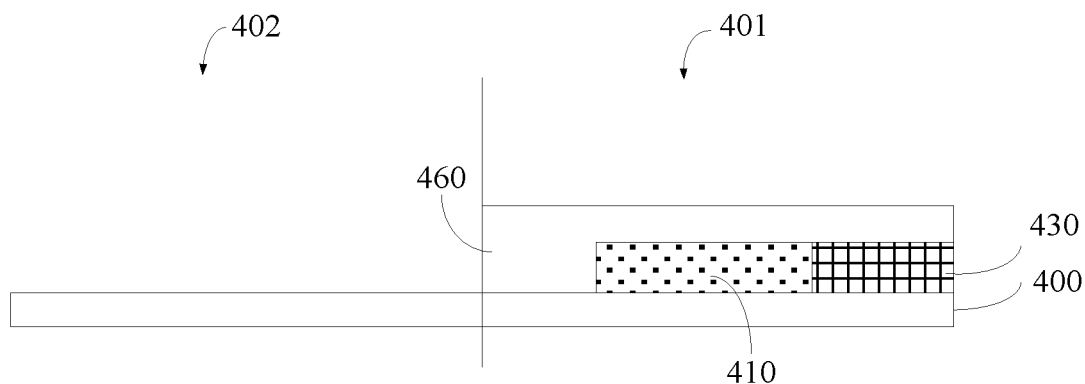

As shown in FIG. 32, the insulating layer 461 is formed in the first area 401. Here, the thickness of the insulating layer 461 is greater than the thickness of the first touch electrode 410, so that the insulating layer 461 can completely cover the first touch electrodes 410 and the first lead wires 430.

In step S64, a second patterned layer is formed on the substrate.

Here, the second patterned layer includes a plurality of second touch electrodes 420, a plurality of second lead wires 440, and a plurality of third lead wires 450. The thickness of the second touch electrodes 420 is greater than the thickness of the first touch electrodes 410. The plurality of second lead wires 440 are located in a second area 402 and are connected to the second touch electrodes 420 in a one-to-one correspondence. The plurality of third lead wires 450 are connected to the plurality of second lead wires 440 in a one-to-one correspondence.

For example, the second patterned layer can be manufactured in the following manner:

In step 1, the plurality of second touch electrodes are formed in the second area of the substrate.

Figure 33:
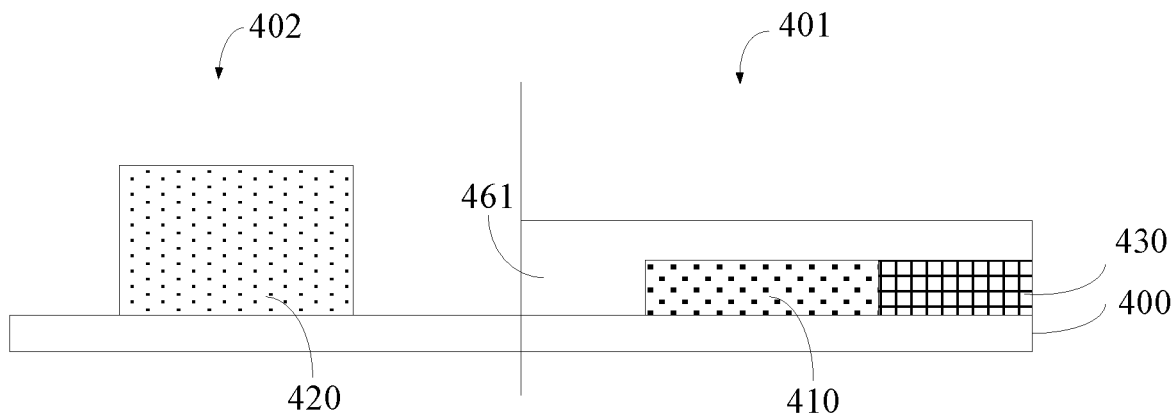

As shown in FIG. 33, the second touch electrodes 420 are formed in the second area 402. The thickness of the second touch electrodes 420 is greater than the thickness of the first touch electrodes 410.

In step 2, the insulating layer is formed in the second area of the substrate.

Figure 34:
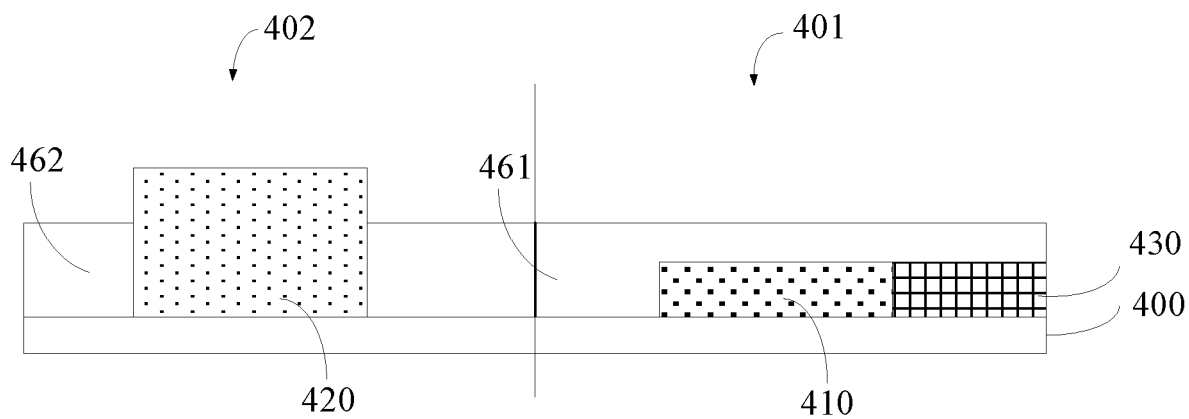

As shown in FIG. 34, the insulating layer 462 is formed in the second area 402. The thickness of the insulating layer 462 may be the same as the thickness of the insulating layer 461.

In step 3, the plurality of third lead wires are formed in the first area, and the plurality of second lead wires are formed in the second area.

Reference can be made to FIG. 12 for the structure in which the plurality of third lead wires and the plurality of second lead wires have been fored.

Here, the first touch electrodes 410 and the second touch electrodes 420 are separately manufactured, so that it is convenient to manufacture the first touch electrodes 410 and the second touch electrodes 420 with different thicknesses.

Figure 35:
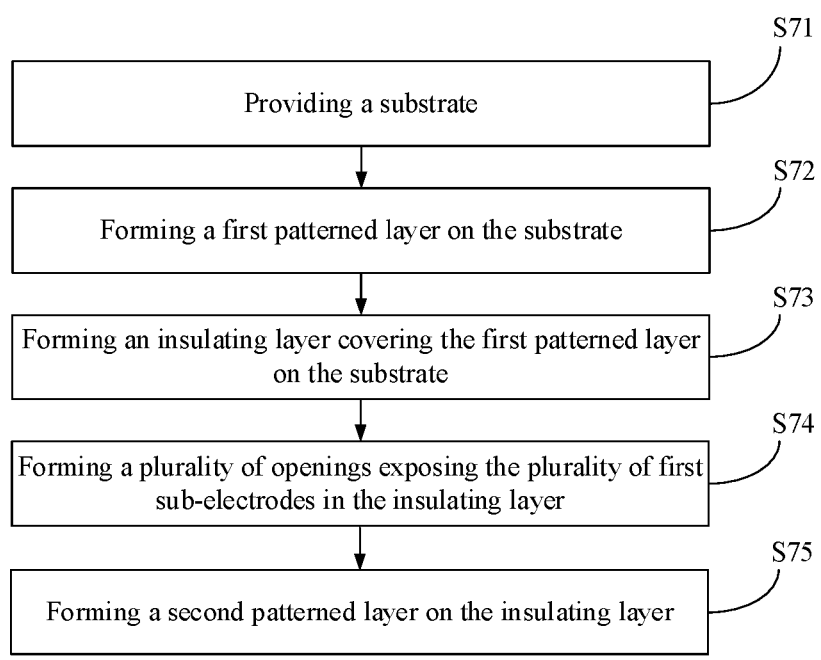
FIG. 35 is a flowchart of another method for manufacturing a touch substrate according to an embodiment of the present disclosure.

FIG. 35 is a flowchart of another method for manufacturing a touch substrate according to an embodiment of the present disclosure. The method may also be used to manufacture the touch substrate shown in FIG. 11. As shown in FIG. 35, the manufacturing method includes the following steps S71-S75.

In step S71, a substrate is provided.

In step S72, a first patterned layer is formed on the substrate.

Figure 36:
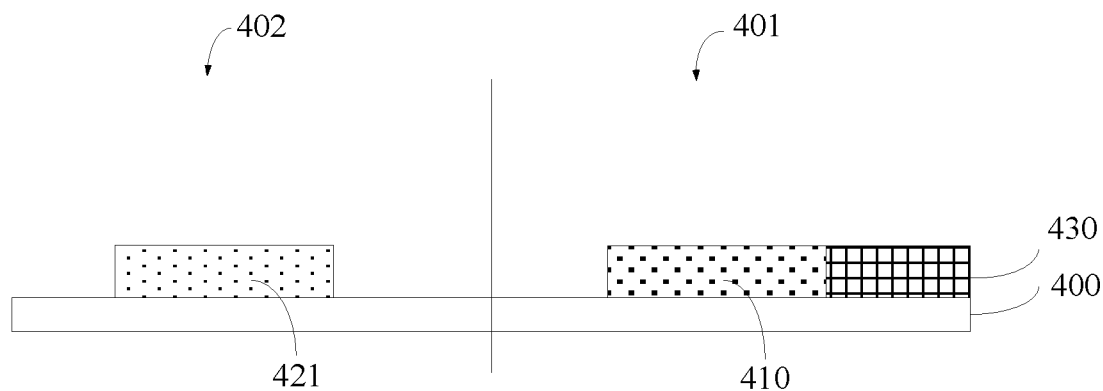
FIGS. 36 to 38 is a schematic diagram of a process of manufacturing a touch substrate according to an embodiment of the present disclosure.

As shown in FIG. 36, the first patterned layer includes a plurality of first touch electrodes 410, a plurality of first lead wires 430, and a plurality of first sub-electrodes 421. The plurality of first sub-electrodes 421 are located in a second area 402.

For example, the first patterned layer may be produced by forming a first film layer on the substrate, and performing a patterning process thereon.

In step S73, an insulating layer covering the first patterned layer is formed on the substrate.

Figure 37:
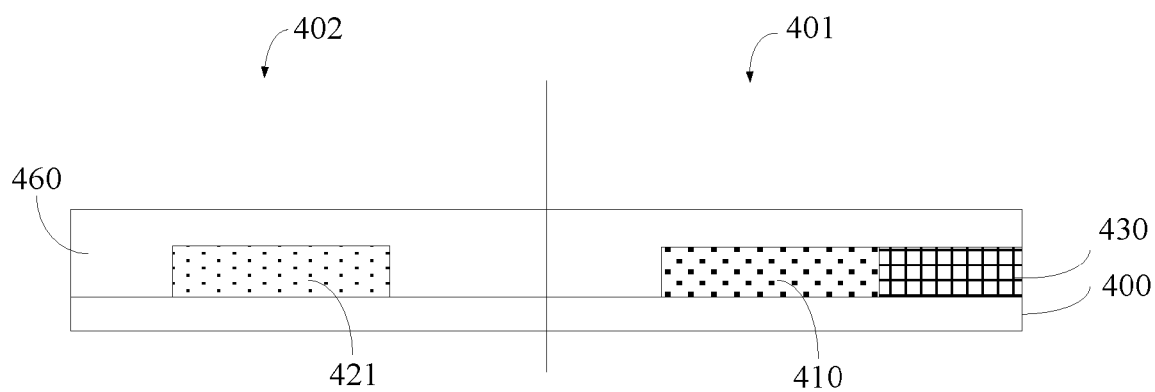

As shown in FIG. 37, the insulating layer 460 is disposed to completely cover the plurality of first touch electrodes 410, the plurality of first lead wires 430, and the plurality of first sub-electrodes 421.

In step S74, a plurality of openings exposing the plurality of first sub-electrodes are formed in the insulating layer.

Figure 38:
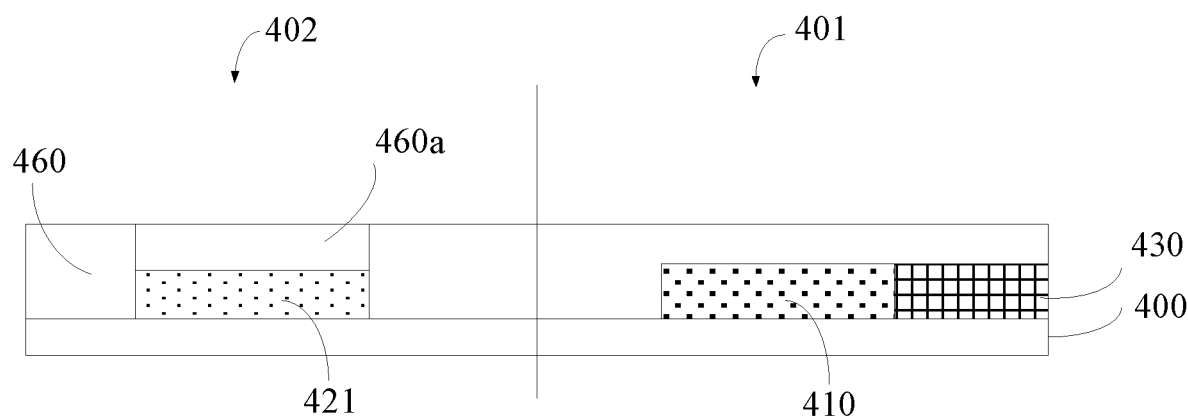

As shown in FIG. 38, the plurality of openings 460a and the plurality of first sub-electrodes 421 are arranged in a one-to-one correspondence.

Orthographic projections of the openings 460a and the first sub-electrodes 421 onto the substrate 400 overlap, thereby facilitating subsequent manufacturing of second sub-electrodes.

In step S75, a second patterned layer is formed on the insulating layer.

Reference can be made to FIG. 11 for the structure in which the second patterned layer has been formed. The second patterned layer includes the plurality of second lead wires 440, the plurality of third lead wires 450, and the plurality of second sub-electrodes having a one-to-one correspondence to the plurality of first sub-electrodes 421. The plurality of second lead wires 440 are connected to the plurality of second sub-electrodes in a one-to-one correspondence. The plurality of second sub-electrodes are located in the plurality of openings 460a. The second sub-electrodes are stacked on the corresponding first sub-electrodes 421. The stacked first sub-electrode 421 and second sub-electrode form the second touch electrode 420.

Optionally, when manufacturing a touch substrate through any manufacturing method shown in FIG. 15 to FIG. 35, one of the first patterned layer and the second patterned layer that includes the plurality of first lead wires may further include a plurality of fourth lead wires. Orthographic projections of the plurality of fourth lead wires and the plurality of second lead wires onto the substrate overlap. The plurality of fourth lead wires and the plurality of second lead wires are connected in a one-to-one correspondence by vias. By adding the fourth lead wires, the total resistance of the lead wires connecting the second touch electrodes and a touch IC can be reduced.

Figure 39:
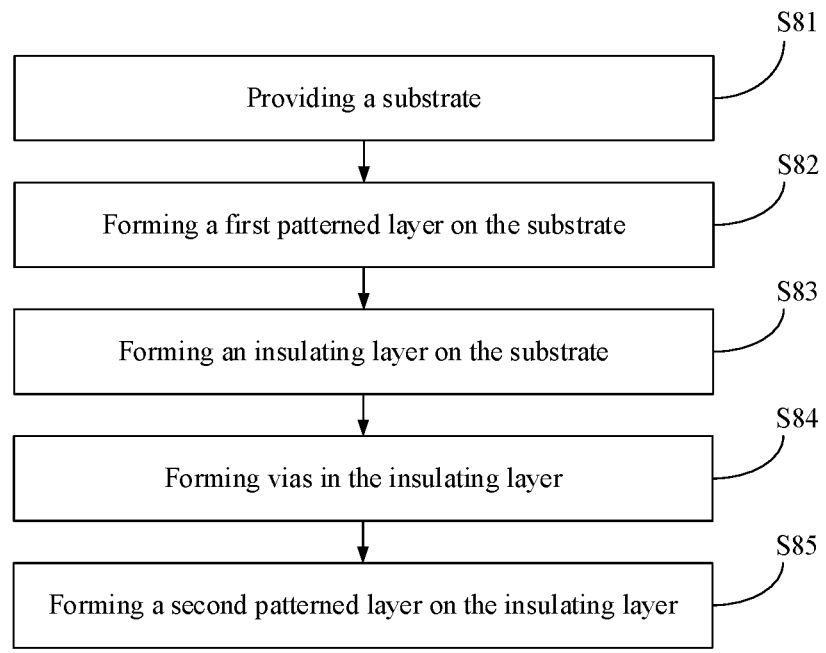
FIG. 39 is a flowchart of a method for manufacturing a touch substrate according to an embodiment of the present disclosure.

FIG. 39 is a flowchart of a method for manufacturing a touch substrate according to an embodiment of the present disclosure. The method is used to manufacture the touch substrate shown in FIG. 12. As shown in FIG. 39, the manufacturing method includes the following steps S81-S85.

In step S81, a substrate is provided.

In step S82, a first patterned layer is formed on the substrate.

Figure 40:
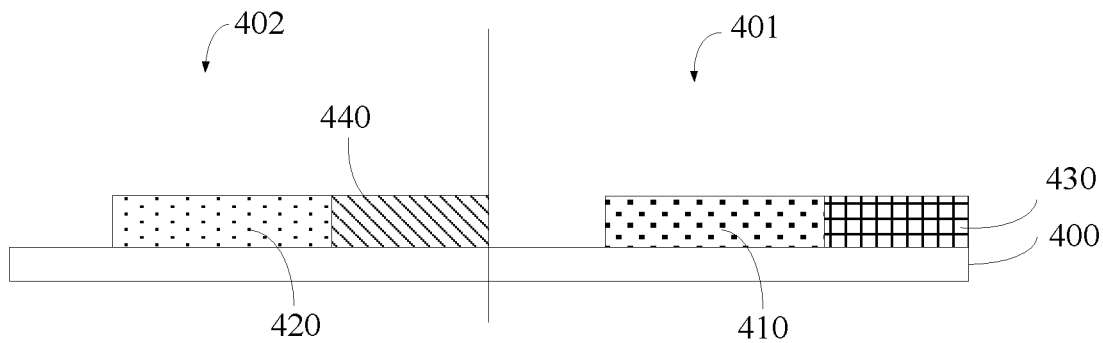
FIGS. 40 to 41 is a schematic diagram of a process of manufacturing a touch substrate according to an embodiment of the present disclosure.

As shown in FIG. 40, the first patterned layer includes a plurality of first touch electrodes 410, a plurality of first lead wires 430, a plurality of second touch electrodes 420, and a plurality of second lead wires 440 arranged in an array.

For example, the first patterned layer may be produced by forming a first film layer on the substrate, and performing a patterning process thereon.

The first film layer may be made of a transparent conductive material, for example, ITO or IZO.

In step S83, an insulating layer is formed on the substrate.

For example, the insulating layer may be a SiO2 layer. The SiO2 layer has good insulation performance and light transmittance.

Figure 41:
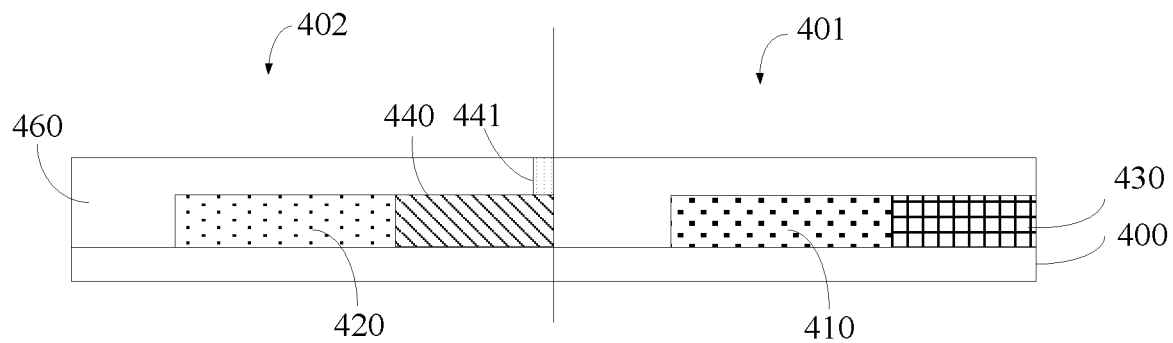

As shown in FIG. 41, the thickness of the insulating layer 460 is greater than the thickness of the first patterned layer, so that the insulating layer 460 covers the first patterned layer.

In step S84, vias are formed in the insulating layer.

As shown in FIG. 41, vias 441 are formed in the insulating layer 460.

In step S85, a second patterned layer is formed on the insulating layer.

Reference can be made to FIG. 12 for the structure in which the second patterned layer has been formed. Here, the second patterned layer includes a plurality of third lead wires 450 and a plurality of joints 451. The plurality of third lead wires 450 are connected to the plurality of joints 451 in a one-to-one correspondence. The plurality of joints 451 are connected to the plurality of second lead wires 440 in a one-to-one correspondence by the vias 441.

For example, the second patterned layer may be produced by forming a second film layer on the insulating layer 260, and performing a patterning process thereon.

The second film layer may be made of a transparent conductive material, for example, ITO or IZO.

In another embodiment of the present disclosure, the joints 451 can be disposed in the first patterned layer, and the joints 451 and the vias 441 are both disposed in a first area 401.

In another embodiment of the present disclosure, patterning processes can be changed, so that the third lead wires 450 are disposed in the first patterned layer, and the first touch electrodes 410, the first lead wires 430, the second lead wires 440, and the second touch electrodes 420 are disposed in the second patterned layer.

It should be noted that, in related embodiments of FIG. 15 to FIG. 41, reference can be made to the foregoing embodiments for the connection relationship and position relationship between electrodes and lead wires in each patterned layer. Details are omitted herein.

The foregoing descriptions are merely optional embodiments of the present disclosure, and are not intended to limit the present disclosure. Within the spirit and principles of the disclosure, any modifications, equivalent substitutions, improvements, etc., are within the protection scope of the present disclosure.

What is claimed is:

1. A touch substrate, comprising:
a substrate, the substrate having a first area and a second area arranged side by side in a direction parallel to the substrate;
a plurality of touch electrodes, the plurality of touch electrodes being arranged in an array on the substrate, and the plurality of touch electrodes comprising a plurality of first touch electrodes located in the first area and a plurality of second touch electrodes located in the second area; and
a plurality of lead wires, the plurality of lead wires being located on the substrate and extending along an arrangement direction of the first area and the second area, and the plurality of lead wires comprising a plurality of first lead wires, a plurality of second lead wires, and a plurality of third lead wires,
wherein the plurality of first lead wires are located in the first area and are connected to the first touch electrodes in a one-to-one correspondence, the plurality of second lead wires are located in the second area and are connected to the second touch electrodes in a one-to-one correspondence, the plurality of first lead wires and the plurality of second lead wires extend toward a side where the first area is located,
the plurality of third lead wires are located in the first area and are insulated from the first touch electrodes, the plurality of third lead wires are connected to the plurality of second lead wires in a one-to-one correspondence, and a unit length of the third lead wires has a lower resistance than a unit length of the second lead wires,
wherein the second touch electrodes comprise two layers of sub-electrodes. orthographic projections of the two layers of sub-electrodes onto the substrate overlap, and the two layers of sub-electrodes are connected by vias.

2. The touch substrate according to claim 1, wherein the plurality of third lead wires and the plurality of first touch electrodes are in different layers.

3. The touch substrate according to claim 2, wherein a width of the third lead wires is greater than a width of the second lead wires, and the third lead wires and the second lead wires are made of a same material.

4. The touch substrate according to claim 3, wherein each touch electrode is rectangular, and the width of the third lead wires is greater than 20% of a width of the touch electrodes.

5. The touch substrate according to claim 1, wherein a thickness of the third lead wires is the same as a thickness of the second lead wires.

6. The touch substrate according to claim 2, wherein projections of each third lead wire and at least one of the first touch electrodes onto the substrate partially overlap.

7. The touch substrate according to claim 1, wherein the plurality of third lead wires and the plurality of second lead wires have any one of the following relationships:
   the plurality of third lead wires and the plurality of second lead wires are in a same layer;
   the plurality of third lead wires and the plurality of second lead wires are in different layers, and each third lead wire and a corresponding second lead wire are connected by vias.

8. The touch substrate according to claim 1, wherein one layer of sub-electrodes of the two layers of sub-electrodes and the first touch electrodes are in a same layer, and the other layer of sub-electrodes of the two layers of sub-electrodes and the third lead wires are in a same layer.

9. The touch substrate according to claim 1, wherein a thickness of the second touch electrodes is greater than a thickness of the first touch electrodes.

10. The touch substrate according to claim 1, wherein the plurality of first lead wires and the plurality of first touch electrodes are in a same layer.

11. The touch substrate according to claim 1, wherein the plurality of second lead wires and the plurality of first touch electrodes are in a same layer.

12. The touch substrate according to claim 1, wherein the touch substrate further comprises fourth lead wires located in a different layer from the second lead wires, orthographic projections of the fourth lead wires onto the substrate and orthographic projections of the second lead wires on the substrate overlap, and the fourth lead wires and the second lead wires are connected by vias.

13. The touch substrate according to claim 1, wherein the plurality of touch electrodes and the plurality of lead wires are all made of a transparent conductive material.

14. A touch device, comprising a touch substrate, the touch substrate comprising:
   a substrate, the substrate having a first area and a second area arranged side by side in a direction parallel to the substrate;
   a plurality of touch electrodes, the plurality of touch electrodes being arranged in an array on the substrate, and the plurality of touch electrodes comprising a plurality of first touch electrodes located in the first area and a plurality of second touch electrodes located in the second area; and
   a plurality of lead wires, the plurality of lead wires being located on the substrate and extending along an arrangement direction of the first area and the second area, and the plurality of lead wires comprising a plurality of first lead wires, a plurality of second lead wires, and a plurality of third lead wires,
   wherein the plurality of first lead wires are located in the first area and are connected to the first touch electrodes in a one-to-one correspondence, the plurality of second lead wires are located in the second area and are connected to the second touch electrodes in a one-to-one correspondence, the plurality of first lead wires and the plurality of second lead wires extend toward a side where the first area is located,
   the plurality of third lead wires are located in the first area and are insulated from the first touch electrodes, the plurality of third lead wires are connected to the plurality of second lead wires in a one-to-one correspondence, and a unit length of the third lead wires has a lower resistance than a unit length of the second lead wires;
   wherein the second touch electrodes comprise two layers of sub-electrodes, orthographic projections of the two layers of sub-electrodes onto the substrate overlap, and the two layers of sub-electrodes are connected by vias.

15. A method for manufacturing a touch substrate, comprising:
   providing a substrate; and
   forming a plurality of touch electrodes and a plurality of lead wires on the substrate, wherein
   the plurality of touch electrodes are arranged in an array on the substrate, the plurality of touch electrodes comprise a plurality of first touch electrodes located in a first area and second touch electrodes located in a second area, and the first area and the second area are arranged side by side on the substrate,
   the plurality of lead wires extend along an arrangement direction of the first area and the second area, the plurality of lead wires comprise a plurality of first lead wires, a plurality of second lead wires, and a plurality of third lead wires, the plurality of first lead wires are located in the first area and are connected to the first touch electrodes in a one-to-one correspondence, the plurality of second lead wires are located in the second area and are connected to the second touch electrodes in a one-to-one correspondence, all the plurality of first lead wires and the plurality of second lead wires extend toward a side where the first area is located, the plurality of third lead wires are located in the first area and are insulated from the first touch electrodes, the plurality of third lead wires are connected to the plurality of second lead wires in a one-to-one correspondence, and a unit length of the third lead wires has a lower resistance than a unit length of the second lead wires;
   wherein the second touch electrodes comprise two layers of sub-electrodes, orthographic projections of the two layers of sub-electrodes onto the substrate overlap, and the two layers of sub-electrodes are connected by vias.

16. The touch substrate according to claim 1, wherein the second touch electrodes comprise two layers of sub-electrodes, orthographic projections of the two layers of sub-electrodes onto the substrate overlap, and the two layers of sub-electrodes are connected by vias;
   one layer of sub-electrodes of the two layers of sub-electrodes and the first touch electrodes are in a same layer, and the other layer of sub-electrodes of the two layers of sub-electrodes and the third lead wires are in a same layer;
   the plurality of touch electrodes and the plurality of lead wires are all made of a transparent conductive material, and a width of the third lead wires is greater than a width of the second lead wires.

* * * * *